US012499467B2

(12) United States Patent
Silberman et al.

(10) Patent No.: US 12,499,467 B2
(45) Date of Patent: Dec. 16, 2025

(54) PREDICTING THE EFFECTIVENESS OF A MARKETING CAMPAIGN PRIOR TO DEPLOYMENT

(71) Applicant: Cerebri AI Inc., Austin, TX (US)

(72) Inventors: Gabriel M. Silberman, Austin, TX (US); Michael L. Roberts, Austin, TX (US); Jean Belanger, Austin, TX (US); Hessie Jones, Pickering (CA); Karen Bennet, Toronto (CA)

(73) Assignee: Cerebri AI Inc., Austin, TX (US)

( * ) Notice: Subject to any disclaimer, the term of this patent is extended or adjusted under 35 U.S.C. 154(b) by 954 days.

(21) Appl. No.: 17/075,541

(22) Filed: Oct. 20, 2020

(65) Prior Publication Data

US 2021/0035152 A1  Feb. 4, 2021

Related U.S. Application Data

(63) Continuation of application No. 15/647,338, filed on Jul. 12, 2017, now abandoned.

(51) Int. Cl.
*G06Q 30/0242* (2023.01)
*G06Q 30/0204* (2023.01)
*G06Q 30/0241* (2023.01)

(52) U.S. Cl.
CPC ..... *G06Q 30/0243* (2013.01); *G06Q 30/0204* (2013.01); *G06Q 30/0244* (2013.01); *G06Q 30/0247* (2013.01)

(58) Field of Classification Search
None
See application file for complete search history.

(56) References Cited

U.S. PATENT DOCUMENTS

2017/0063901 A1* 3/2017 Muddu .................. H04L 43/08

OTHER PUBLICATIONS

"A classification of user-generated content into consumer decision journey stages", by Silvia Vázquez, et al,—Neural Networks vol. 58, published in 2014. Available at: https://www.sciencedirect.com/science/article/pii/S0893608014001403 (Year: 2014).*

* cited by examiner

*Primary Examiner* — Katherine Kolosowski-Gager
(74) *Attorney, Agent, or Firm* — Pillsbury Winthrop Shaw Pittman LLP

(57) ABSTRACT

In some implementations, a computing device may determine, from multiple data sources, multiple event timelines, with each event timeline associated with a customer. Each event in an event timeline represents an interaction between the customer and a vendor of goods and/or services. For N (N>1) marketing campaigns, N augmented timelines may be created for each timeline by augmenting each event timeline with the individual marketing campaigns. Thus, for M (M>1) customers, M×N augmented event timelines may be created. A trained machine learning model may perform an analysis of each augmented event timeline to predict results of executing each marketing campaign. The results may include total predicted revenue and total predicted cost resulting from executing each marketing campaign. A particular marketing campaign from the N marketing campaigns may be selected and execution of one or more marketing events may be initiated.

20 Claims, 14 Drawing Sheets

PREDICTING THE EFFECTIVENESS OF A MARKETING CAMPAIGN PRIOR TO DEPLOYMENT

CROSS-REFERENCE TO RELATED APPLICATIONS

This patent application is a continuation of U.S. patent application Ser. No. 15/647,338, titled PREDICTING THE EFFECTIVENESS OF A MARKETING CAMPAIGN PRIOR TO DEPLOYMENT filed 12 Jul. 2017. The entire content of each parent application is incorporated by reference in its entirety.

BACKGROUND OF THE INVENTION

Field of the Invention

The invention relates to artificial intelligence (AI) and more particularly to machine learning. More particularly, the invention relates to predicting, using machine learning, the effectiveness (e.g., in terms of total revenue generated, associated costs, and the like) of a marketing campaign based on modeling consumer behavior.

Description of the Related Art

The goal of a vendor (e.g., a business vendor or a service provider), is to efficiently and cost-effectively maintain a close relationship with each customer. In particular, a vendor may desire to understand what motivates a customer to purchase a product or a service. For example, prior to purchasing an item (e.g., a product or a service), a customer may have several interactions with the vendor, such as visiting a website to obtain detailed information about the item, chatting (e.g., online or in-person) with a salesperson, and the like. Subsequent to purchasing the item, the customer may have additional interactions with the vendor, such as obtaining warranty service, chatting with a salesperson, purchasing an additional item (e.g., an accessory to the first item that was purchased). However, the vendor may be unable to quantify what value the customer places on each interaction. This may result in the vendor spending money to facilitate interactions with the customer that the customer does not value while not spending enough money on interactions that the customer does value. For example, the vendor may spend money to (1) have a salesperson call the customer and (2) by sending product brochures to the customer via mail. The vendor may be unable to quantify the value of these interactions for this particular customer.

Traditionally, companies rely on performance metrics to determine a customer's intent to purchase a product or a service. The performance metrics, such as, for example, media impressions, website visits, clicks on online advertising, and online shares, may be correlated to a person's affinity to a specific product or brand. While sometimes not directly attributable to a particular purchase, marketers may also take into account "a halo" effect, in which viewing an advertisement subconsciously influences and eventually leads to a purchase decision.

One of the main issues that vendors face when designing marketing campaigns is attribution, e.g., determining which specific combination of messages, media, format, and the like is directly linked to a purchase activity. The difficulty in determining attribution is that a particular customer may be exposed to multiple messages in multiple formats delivered via multiple media within the same time-frame. For example, when a particular customer clicks on an online ad, receives an email in response, clicks on the email, and then receives a brochure, determining which particular medium primarily influenced the purchase may be difficult.

SUMMARY OF THE INVENTION

In some implementations, a computing device may determine, from multiple data sources, multiple event timelines, with each event timeline associated with a customer. Each event in an event timeline may be an event associated with a customer, such as, for example, an interaction between the customer and a vendor of goods and/or services, a social media post made by the customer that references the vendor, and the like. For N (N>1) marketing campaigns, N augmented timelines may be created for each timeline by augmenting each event timeline with the individual marketing campaigns. Thus, for M (M>1) customers, M×N augmented event timelines may be created. A trained machine learning model may perform an analysis of each augmented event timeline to predict results of executing each marketing campaign. The results may include total predicted revenue and total predicted cost resulting from executing each marketing campaign. A particular marketing campaign from the N marketing campaigns may be selected and execution of one or more marketing events may be initiated.

For example, a computing device may include non-transitory computer-readable storage media (e.g., a memory storage device) storing instructions executable by one or more processors to perform various operations. The operations may include determining a plurality of event timelines based on multiple data sources, such as a customer relationship management (CRM) database, a call-center database, click-through-rate (CTR) data stored by a web hosting server, an electronic mail (email) server storing emails and online chats (e.g., via instant messaging), social media (e.g., Facebook®, Twitter®, Instagram®, and the like). For example, a customer's post on social media may be (1) a direct engagement with the vendor, e.g., by posting in a channel associated with the vendor, (2) a direct or indirect mention of the vendor in a post (e.g., this may be used to measure of positive or negative sentiment), (3) a mention of the vendor via a planned campaign (e.g., customer receives a marketing email offering the customer a coupon or discount in exchange for mentioning the vendor in a post on a particular social media platform (e.g., these actions may be monitored and measured for performance/results). The events may also include global events, such as, for example, extreme weather, changes in benchmark interest rates, local or global economic or geo-political events, as well as events pertaining to the customer, such as losing a smartphone, having a car accident, graduating from school, adopting a child, and the like. Each event timeline of the plurality of event timelines may include a series of events along a timeline, with each event representing an interaction between a customer and a vendor. Thus, an event timeline may be determined for each customer. The event timeline may be for a predetermined period of time.

The operations may include selecting a plurality of marketing campaigns, where each marketing campaign of the plurality of marketing campaigns includes one or more marketing events representing actions to be performed by (or on behalf of) the vendor. For example, a marketing agency may perform the actions on behalf of the vendor. Each marketing campaign may include actions, such as, for example, sending an email, displaying a web advertisement, sending a mailer (e.g., printed materials that are physically delivered to the customer), playing a pre-recorded message, having a salesperson contact (e.g., via email, chat, telephone, or the like) the customer, and other marketing-related actions. In some cases, a same set of customers may be targeted by more than one marketing campaign and may, for example, receive concurrent communications from multiple marketing campaigns.

The operations may also include creating a set of augmented event timelines for each customer by augmenting the customer's event timeline with a particular marketing campaign. For N (N>1) marketing campaigns, N augmented timelines may be created for each timeline by augmenting each event timeline with the individual marketing campaigns. Thus, for M (M>1) customers, M×N augmented event timelines may be created.

The operations may further include using a trained machine learning model to perform an analysis of each augmented event timeline to predict a result of executing each marketing campaigns on each customer. The results may include a total revenue that each marketing campaign is predicted to yield, the total costs to execute each marketing campaign, the total number of customers that each marketing campaign will reach, which marketing actions are predicted to positively impact revenue, which marketing actions are predicted to negatively impact revenue, building a positive brand reputation/value or social acceptance), (e.g., in some cases, revenue may be a secondary goal but not necessarily the primary goal), and the like. Brand reputation/value, may be measured using statistics such as, for example, number of shares, number of comments, number of hits (e.g., amount of traffic) and the like. Based on the predicted results, one or more marketing campaigns may be selected and execution of the one or more marketing plans initiated. For example, the one or more marketing campaigns may be selected based on weighing various tradeoffs, including the total revenue that each marketing campaign is predicted to yield, the total costs to execute each marketing campaign, and the like. To illustrate, marketing campaigns may be selected for execution to keep within a predetermined marketing budget (e.g., within a predetermined cost) while achieving an increase in revenue that satisfies a predetermined threshold.

In some cases, customers that responded to a particular marketing campaign in a similar manner (e.g., the particular marketing campaign resulted in the highest predicted revenue compared to the other marketing campaigns for those customers) may be grouped together. For example, each customer may be selected in turn and the plurality of augmented event timelines associated with the customer may be identified. An augmented event timeline of the plurality of augmented event timelines with a highest predicted revenue may be identified for the customer. The customer and associated data (e.g., predicted revenue, predicted cost, etc.) may be added to a group corresponding to the particular marketing campaign that was used in the augmented event timeline with the highest predicted revenue. In this way, a group corresponding to each marketing campaign may include a set of customers that responded to the corresponding marketing campaign in a similar manner (e.g., with the highest predicted revenue). For each group, a total number of customers in the group, a total amount of predicted revenue for the group, a total cost to execute the marketing campaign to members of the group, and other totals may be determined. At least one marketing campaign may be selected for execution based at least in part on the total number of customers in each group, the total amount of predicted revenue determined for each group, the total cost to execute the marketing campaign to members of the particular group, and the like. For example, a marketing campaign may be selected based on weighing various tradeoffs, including the vendor's desire to generate at least a predetermined amount of revenue, to stay within a predetermined marketing budget, to reach at least a predetermined amount of customers, to generate at least a predetermined amount of revenue per unit of currency (e.g., dollar) spent to execute the marketing campaign, and the like.

In some cases, a string of symbols may be created based on and corresponding to each augmented event timeline, where each symbol in the string of symbols corresponds to an event (including marketing actions from a marketing campaign) in the augmented event timeline. If an event in an event timeline includes a revenue event, the symbol corresponding to the event may be modified to include a revenue indicator. For example, the revenue indicator may include one of an actual revenue amount, a revenue range (e.g., 0-1000, 1001-10,000, 10,000-50,000, and the like), or a revenue magnitude (e.g., tens of dollars, hundreds of dollars, thousands of dollars, tens of thousands of dollars, and the like). The trained machine learning model may be used to predict one or more next symbols (e.g., a next revenue event) based on analyzing the string of symbols corresponding to the augmented event timeline.

DETAILED DESCRIPTION

Figure 1:
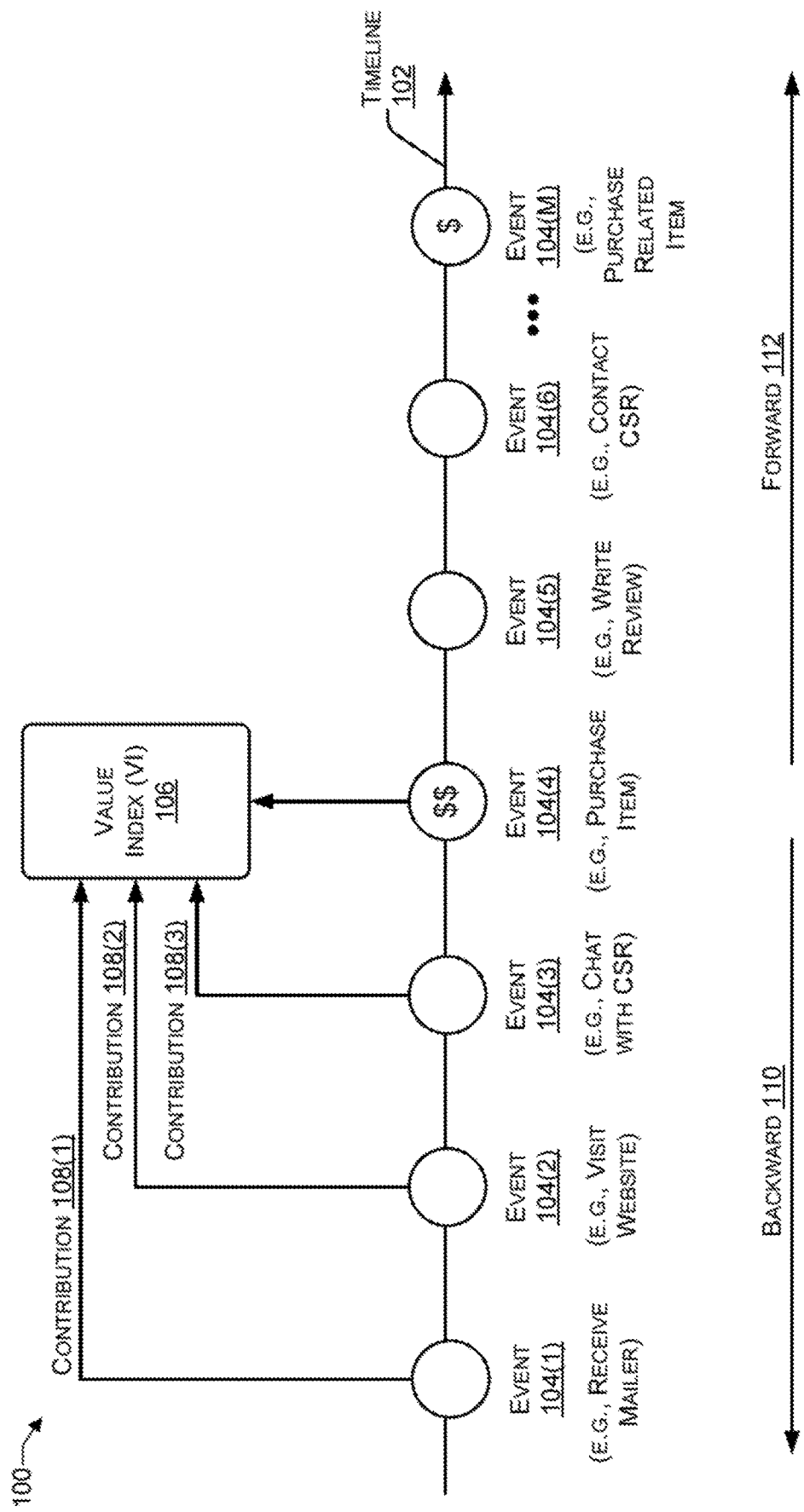
FIG. 1 is a block diagram illustrating an event timeline according to some embodiments.

The systems and techniques described herein provide a granular view of company initiatives and marketing campaigns to determine individual customer's propensity to respond to offers, media, and formats. The term "customer" may refer to a current customer, a past customer, a potential customer, or a person that the vendor desires to acquire as a customer. The granular view may encompass the company's entire customer base, rather than a particular segment (e.g., customers who purchase more than a predetermined amount). The systems and techniques enable market segmentation that takes into consideration individual's behavior and outcomes of those behaviors. The systems and techniques may use the customer data captured by a vendor directly from the vendor's own systems (e.g., customer relationship management (CRM), website visits, email click-through-rate (CTR), and the like), or may be obtained from a third party. In some cases, the customer data may be correlated and aggregated by a third party to provide information about particular customers or particular sets (e.g., separated into sets based on demographics) of customers. By creating a value for each customer and their corresponding affinities to particular products and to particular messages delivered via particular mediums, marketing campaigns can be tailored to provide a combination of campaign, offers, and resulting customers according to the vendor's desires.

Conventional techniques to determine a next best action (NBA) based on historical data typically focus on a single customer and reactive actions performed to accomplish a desired outcome. However, conventional techniques ignore dependencies to reduce computational complexity. For example, when evaluating marketing campaigns for NBA using conventional techniques, decisions are usually based on responses to A-B testing of a-priori options, a live run on a small portion (~20%) of the target population that uses less than a 15% response rate to trigger a selection of A or B. This results in conventional techniques determining the opinion of, at most, 3% of the target population. In contrast, the systems and techniques described herein determine vendor values based on a large population of customers (e.g., all customers for whom data is available) collected over a large number of customer journeys (e.g., event timelines), to identify explicit tradeoffs among expected revenue, brand value, and marketing costs. The systems and techniques described herein take a set of customer journeys (e.g., customer event timelines) and a set of possible marketing campaigns and evaluate each marketing campaign against a set of objectives (e.g., revenue) and a set of constraints (e.g., costs).

The term "vendor value" refers to the value a particular customer has for a vendor (e.g., a vendor of goods and/or services) expressed as a currency value (e.g., U.S. dollars in the United States of America, Canadian dollars in Canada, etc.). The vendor value may be determined by analyzing available data associated with the particular customer's journey, and assigning a monetary value to each event in the event timeline (e.g., journey). The analysis may be performed using machine learning (e.g., artificial intelligence), such as support vector machine, (SVM), decision tree learning, association rule learning, artificial neural networks, deep learning, inductive logic programming, clustering, Bayesian networks, reinforcement learning, representation learning, rule-based machine learning and the like. Because the vendor value to a particular customer may vary over time, the term "current vendor value" (CVV) refers to the vendor's value to the customer at a particular point in time.

The CVV of each event leading up to an important outcome represents its relative contribution to the outcome, and is determined by analyzing data associated with interactions (e.g., events) between the customer and the vendor. The CVV for each event after an important outcome (1) indicates the potential impact of each event on future events, (2) indicates the contribution to an expected outcome, and (3) can be used to predict or trigger future events. The CVV can thus be used to identify as proxy expected outcomes for events in an event timeline.

The systems and techniques may also determine whether the time period between two events is relevant. The time period between two events is determined by a difference in a first timestamp of a first event and a second timestamp of a second and subsequent event between events. The time period may be added as a feature (e.g., descriptor) to the subsequent event. The time period may be used to decay the CVV to account for the diminished impact of older events while increasing the importance of more recent events. The systems and techniques may determine whether the time period between the two events is relevant. For example, in some cases, the impact of older events may not diminish significantly after a particular time period while in other cases the impact of older events may be significantly diminished after the particular time period has elapsed.

The systems and techniques described herein encompass at least two trained machine learning models ("trained models"). A first trained machine learning model, a vendor value prediction (VVP) model may be used to determine the CVV. For example, the CVV may be predicted for each action in marketing campaign, e.g., sending a mailer with a coupon changes the vendor value by $X, sending an email with an offer changes the vendor value by $Y, visiting the vendor's retail showroom and talking to a salesperson changes the vendor value by $Z (where X, Y, and Z are each a negative or a positive currency amount). The VVP model may determine an ending vendor value, e.g., the vendor value after the marketing campaign has ended. A second trained machine learning model, the next symbol predictor (NSP) model, may be used to predict N next events (where N>0) that occur after the marketing campaign has ended. For example, the NSP model may predict that, based on past events in the event timeline, a particular marketing campaign's set of actions will cause a customer to purchase an item worth a predicted amount. To illustrate, the NSP model may predict that a particular campaign will cause a customer to spend $30,000 to purchase a car from the vendor.

Training the VVP model to determine vendor values using historical event timelines may be done initially, and repeated if event timelines change significantly (e.g., greater than a threshold amount) over time. The resulting VVP model creates a representation of customer behavior. In some cases, the event timelines may be segmented by selecting a subset of customers for training the VVP model. Segmenting may be performed based on target market segments, based on specific time cycles (e.g., seasonal), and the like.

Virtual A-Z testing (VAZT) generalizes A-B testing to assess preferences among multiple options (hence A-Z, instead of A-B testing). The testing is performed without the vendor interacting with customers (hence virtual) using available customer interaction information (e.g., from CRM, CTR, and other customer-related data that the vendor and/or third-party gathers). The marketing campaigns to be tested may be automatically created, manually created, or a combination of both.

Each marketing campaign that is to be tested may include a sequence K of one/more actions K(1) to K(N) that can be performed. The sequence K is virtually added to a customer's event timeline. The sequence K represents a particular combination of offerings (e.g., online ad, email, mailer and the like), channels (e.g., search engine ad, specific site ads, print ads, television ads, online ad, and the like), and the relative timing of the actions (e.g., mailer is mailed out a week after sending an email).

To determine the effectiveness of a marketing campaign, the sequence of actions K may be added to each event timeline of multiple customer event timelines to create augmented event timelines. Each augmented event timeline may be analyzed using the VVP model to determine a CVV for the end of the augmented event timeline. This process of adding a sequence of actions of a marketing campaign to a customer event timeline may be repeated for each of the multiple customer event timelines. The CVV associated with the end of the customer event timeline represents the value of the vendor at the end of the event timeline, e.g., the ending vendor value. In some cases, for faster results, customers with the same (or within a particular threshold of each other) ending CVV may be grouped together. While this disregards the details of the event timeline, and may result in ignoring insights into individual customers, in some situations, customers with the same CVV may be grouped together. For example, customers may be grouped together based on CVVs that have 1 or more similar patterns in events (within a predefined period in time) that correlate to their common CVV. Such a group has similar values across more granular events or campaign tactics.

The augmented customer event timelines may be ranked by customer using the ending CVV. The ending CVV indicates each customer's marketing preferences (e.g., message, media, timing, etc.). Customers may be grouped based on having a similar (e.g., within a threshold amount) or identical CVV. While the customers in each customer group may or may not have similar demographics, the customers in each customer group may share similar behaviors, e.g., the customers in each group are predicted to respond to a particular marketing campaign in a similar manner, and are predicted to have a similar or identical vendor value at the end of each customer's augmented event timeline.

Once a particular campaign is chosen for analysis by the VVP model, the analysis may follow a particular workflow using established policies, such as, for example, frequency of customer contact, channel specific protocols, or the like. Alternately, the workflow may be customized to a particular customer based on preferences uncovered by the ending CVV. For example, the analysis may determine that customer prefers that a mailer be sent first, then a follow-up call be made either (1) after a particular time period or (2) on a particular date (e.g., birthday, Black Friday, Mother's Day) or season (e.g., Christmas, Thanksgiving, etc.).

The systems and techniques described herein, such as VAZT, may use the ending CVV and an NSP model to predict expected revenue from a marketing campaign. The NSP model may be trained using the same customer event timelines as the VVP model (e.g., determined from customer interaction data, such as CRM, CTR, and the like), to predict specific (or specific ranges of) revenue outcomes for each marketing campaign based on predicting the next symbol in a string of symbols that represent an event timeline.

Creating a String of Symbols Corresponding to a Customer Event Timeline

To create a string of symbols to represent an event timeline, similar events in individual customer event timelines may be assigned the same symbol, e.g., W=website visit, P=purchase, S=service (e.g., car is taken in for servicing), and the like. What comprises a "similar event" may be defined by the vendor. For example, the symbol M may be used to represent mailing printed materials (a "mailer"), include a postcard, a brochure, a letter, or another type of printed material. As another example, the symbol Ps may be used for small purchases, e.g., under a threshold amount (e.g., $1000) while Pl may be used for large purchases greater than or equal to the threshold amount. As yet another example, in some cases, the symbol C may be used for any messaging performed via the customer's cell phone, including text messages and phone calls. In other cases, Ct may be used for text messaging and Cp for phone calls. For each event that results in revenue from a customer, the corresponding symbol may be modified to include the revenue amount, revenue order of magnitude (e.g., a power of 10, where order of magnitude $2=10^2$, $3=10^3$, $4=10^4$, and the like), revenue range, or the like. For example, a purchase of $150 may be represented by one of the symbols P(150) for actual revenue, P($10^2$) for a revenue order of magnitude (e.g., $10^2$ represents a magnitude in the range of 100-999, $10^3$ represents a magnitude in the range of 1000-9999, and the like), p(0-200) for revenue in a particular range, or other type representation. Thus, a string of symbols, with or without symbols indicating the revenue associated with each event, may be created to represent a corresponding customer event timeline. Strings of symbols representing actual customer event timelines may be used to train a next symbol prediction (NSP) model.

After the NSP model has been trained, strings of symbols representing virtual customer event timelines may be created that include the marketing campaigns to be tested. The NSP model may be used with individual strings of symbols (where each string of symbols includes the marketing campaigns) to predict the next symbol in the string of symbols. When the next symbol for a particular string represents a revenue generating event, the amount of revenue (e.g., expressed as an amount, an order of magnitude, a range, etc.) embedded in the symbol represents the yield for a particular campaign for a particular customer (whose interactions are represented as a string of symbols).

In some cases, the NSP model may be trained to predict a next symbol (e.g., a next event), e.g., predicting expected revenue from a next event. In other cases, the NSP model may be trained to predict whether a revenue event will occur (1) within the next N number of symbols or (2) within a pre-defined time window. For example, a "proximate window" (e.g., a window of time that is proximate to the last event in the string of symbols) may be used to define outcomes for training the NSP model, thereby enabling the prediction of expected revenue within the next N events (where N>0). As another example, the NSP model may be trained to predict expected revenue for a pre-determined period of time (e.g., either using specific dates or a specified length of time) by accumulating expected revenue for the time period and assigning the cumulative revenue to a "super event" corresponding to the pre-determined time period. By comparing expected revenue (and cost) for different time periods, marketing campaigns may be adjusted based on various trade-offs, such as increased short-term revenue, increased long-term revenue (including lifetime revenue using an appropriately long-time period), ratio of marketing costs to predicted revenue, and the like. The closer in time a revenue event is to a marketing campaign, the more revenue may be attributed to the campaign because the impact of a campaign typically decays over time, especially when additional campaigns are executed after the campaign.

VAZT uses vendor value as a proxy for expected revenue that is predicted based on customer data. The resulting machine learning models (VVP model and NSP model) may be refined using outcomes of actual marketing campaigns.

Using the outcomes from actual (e.g., not virtual) marketing campaigns may (1) provide new customer outcomes, (2) improve the accuracy of vendor values as a proxy for expected revenue, and (3) be used to create new machine learning models (or re-train existing machine learning models) to improve campaign selection criteria.

Insights Provided by VAZT

VAZT yields insights into the effectiveness of marketing campaigns (e.g., based on potential revenue, increase in vendor value, and the like) for individual customers or for a set of customers based on either a-priori segmentation or segmentation based on the results of the VAZT analysis. Total potential revenue from (1) deploying a marketing campaign to all customers, (2) deploying individual marketing campaigns to individual customer segments (e.g., each customer segment is targeted with a specific marketing campaign), and (3) deploying a particular campaign to an individual customer (e.g., the marketing campaign for each customer may be customized based on data associated with each customer). VAZT also identifies trade-offs between campaigns based on a cost of each campaign per individual, a cost of running different campaigns for different target populations (e.g., customer segments), an expected revenue, an expected change in a vendor's value to each customer, and the like.

Modifying Marketing Campaigns Based on Trade-Offs

Various trade-offs may be used to modify (e.g., fine tune) marketing campaigns to achieve a particular revenue goal while spending a particular amount of money. For example, assume $10M is the maximum attainable revenue. Using a marketing campaign that yields a highest revenue across all customers may yield $7M revenue at a cost of $0.5M for the marketing campaign. VAZT can answer questions such as the following. Which market segment (of the target population) yields the most revenue per cost (e.g., per dollar)? What is the impact on revenue and cost when the target population is reduced to a subset (e.g., segment) of customers? How much of the $3M gap can be attained (and at what cost) by running a second campaign to a subset (e.g., particular segment) of customers? Is there a cheaper overall marketing campaign that yields, within a predetermined amount or percentage (e.g., 90%), the $7M of revenue at a significant cost savings? For example, a particular marketing campaign may be predicted to yield $6.3M (e.g., 90% of $7M) at a cost of $0.2M and may provide the most revenue at the lowest cost (e.g., "biggest bang for the buck").

The cost of a marketing campaign may include (1) the marketing costs, e.g., paying a website owner (e.g., search engine, product website, or the like) for an online ad placement, creating and mailing brochures, and other types of marketing costs and (2) computational costs. Typically, the computational cost may be high to train the machine learning model, but training is typically done either once or when the predicted results of the model diverge from the actual results of implementing the marketing plan(s) by more than a threshold amount (typically every few years). Using the model to analyze each virtual marketing campaign involves running the model on the features (e.g., types of events) in each customer's event timeline, multiplied by the number of customers in the overall target population, multiplied by M number of marketing campaigns (e.g., the campaigns that are being analyzed). Analyzing M campaigns sums up the cost of the virtual event timeline for each customer, and either (1) using the vendor value as a proxy for expected revenue to highlight a sequence of one or more actions or (2) using a separate machine learning model for expected revenue. In some cases, the tradeoffs in terms of marketing costs may result in the selection of marketing campaigns that do not result in the highest vendor value (e.g., the most revenue). For example, the machine learning model may indicate that the highest vendor value is predicted to be achieved using multiple market campaigns targeting a large number of population segments. However, such an approach may be too costly, resulting in a service provider selecting fewer campaigns to target fewer population segments.

Conventional marketing campaigns may be designed using customer data typically select a particular type of offer, a particular media (print, website, email, internet advertisement, and the like), format (e.g., postcard, brochure, coupon, and the like). These choices may resonate with a first set of customers, may be ignored by a second set of customers, and may trigger a negative response from a third set of customers. Thus, conventional marketing campaigns may target customer segments that the vendor or marketing professional considers most relevant, disregarding indifferent responses and negative responses. Such an approach may fail to identify the largest addressable segments, and, in some cases, may trigger a higher than anticipated negative response. Typically, campaign assessment focuses on the potential upside while ignoring the potential downside. The assumptions used to target particular market segments and using specific offers, media, and formats may result in the marketing campaign reaching a portion of the intended customer segment, but may inadvertently induce further customer segmentation. For example, the induced market segmentation may include (1) a first portion of the targeted customer segment may react negatively to the marketing campaign, (2) a second portion of the targeted customer segment may not fit the targeting criteria and may resent being left out, and (3) a portion of the customer segment not targeted by the marketing campaign may not fit the targeting criteria but may respond to campaign. The risks of ignoring induced customer segments include negative brand impact, for segments (1) and (2) and opportunity loss for (3). For example, a financial institution may consider offering a home equity line of credit with particularly attractive terms. The initial segmentation may identify high-value customers, i.e., individuals with high checking or savings account balances across a variety of products and services offered by the institution, as a desired target. By focusing exclusively on the segment of high-value customers, the financial institution may ignore individuals with life events (e.g., recently married, expecting a child) who may be receptive to such an offering but will not receive the offer because they are not in the target segment. In addition, if these individuals learn about the offering (e.g., from friends, relatives, colleagues, advertisement, or the like) but do not receive an offer because they are not targeted by the campaign, they may become upset (e.g., negative vendor value) towards the institution. In addition, these individuals could have been used as influencers within their network (e.g., friends, relatives, colleagues and the like), even if the offering was not directly relevant to them. Since all customers within the selected segment are treated uniformly, there is also a risk of alienating some of them, as they may have reason to resent the timing or messaging of the marketing campaign. For example, an offer for a home equity line of credit for someone who recently divorced and had to sell their home may cause the individual to negatively view the financial institution.

The systems and techniques described herein may identify the largest customer segments to enable the design of a marketing campaign to increase revenue from those segments, identify potential trade-offs (e.g., revenue, cost, offers, media, and formats, and the like), increase customer responses to the marketing campaign, while reducing opportunity loss. The systems and techniques described herein may predict which particular actions in a marketing campaign may cause a significant negative response, thereby enabling marketing campaigns to be designed and executed to avoid such actions, assess a net (e.g., positive-negative) value of a marketing campaign, and protect an image and a value of a vendor's brand. The systems and techniques described herein enable virtual testing (e.g., prior to deployment) of marketing campaigns on all customer segments or on specific customer segments. In this way, marketing campaigns can be cost effectively evaluated and possibly modified (e.g., to reduce negative consequences and increase revenue) prior to execution. Marketing campaigns can be ranked based on their effectiveness on specific types of customers, enabling customers to be grouped together based on how customers react to a particular marketing campaign. Thus, customers that react similarly to a particular marketing campaign may be grouped together to create market segmentation based on the actions performed in a marketing campaign.

Event Timelines and Reference Events

FIG. 1 is a block diagram 100 illustrating an event timeline according to some embodiments. A timeline 102 may include one or more events 104(1), 104(2), 104(3), 104(4), 104(5), 104(6), to 104(M) (where M>0). A vendor may specify certain types of events, referred to as reference events, which the vendor considers particularly meaningful. For example, a reference event may be a revenue event in which the customer made an acquisition (e.g., purchase) of a product or a service. As another example, the reference event may include an event in which the customer made contact with the vendor (e.g., by visiting a retail shop, car dealership, etc.) and made a purchase within a pre-determined period of time (e.g., two weeks). The events prior to a reference event may contribute to the reference event occurring and may be assigned a value to show their relative contribution to the occurrence of the reference event. A reference event may be a single, discrete event, or a reference event may be a set of events (e.g., visit web site and make a purchase).

Each of the events 104 may involve a transaction between a customer and a vendor. For example, the event 104(1) may include the customer receiving a catalog, brochure, or other mailer via mail (or email), piquing the customer's interest in one or more items offered by the vendor. The event 104(2) may include the customer visiting a website of the vendor to research one or more items. The event 104(3) may include the customer chatting (e.g., online or in-person) with a customer service representative (CSR) or other sales representative. The event 104(4) may include the customer purchasing an item. For many businesses, the event 104(4) may be designated as a reference event. The business may use the systems and techniques described herein to determine a value index 106 associated with the event 104(4) and determine a contribution 108(1) associated with the event 104(1), a contribution 108(2) associated with the event 104(2), and a contribution 108(3) associated with the event 104(3). For example, for a first customer, on a scale between 0.00 and 1.00, the contribution 108(1) may be 0.3 (e.g., 30%), the contribution 108(2) may be 0.2 (e.g., 20%), the contribution 108(3) may be 0.5 (e.g., 50%). In this example, the vendor may determine that the customer values the chat with the CSR the most and values visiting the website the least. Based on this information, the vendor may use a CSR (e.g., rather than customized advertisements on the website or customized mailers) to initiate contact with the customer for additional sales (e.g., new sales, up-sells, and cross-sells).

After the reference event occurs, additional (e.g., subsequent) events may occur and the customer may have a value for each of the subsequent events. For example, the event 104(5) may include the customer writing an online review that the vendor publishes on the vendor's website. The event 104(6) may include the customer contacting a CSR. For example, the customer may ask the CSR "How do I do X with the item?" The CSR may suggest that the customer can perform X by purchasing a related item, such as an accessory, to the original item that was purchased at event 104(4). The event 104(M) may include the customer purchasing the related item.

The value index 106 is an integration of several events, e.g., the events 104(1) (receiving a promotional mailer), 104(2) (visiting a website), and 104(3) (online or in-person chat). The additional events include 104(5) (writing a review or responding to a survey), 104(6) (contacting customer service, e.g., to clarify of a product feature or the availability of accessories), and 104(M) (the purchase of a related item). Some of the events 104, such as the purchase event 104(4) have a known value. For example, a customer purchasing a vehicle for $30,000 has a known value, e.g., $30,000, associated with the event. A value (e.g., vendor value, potential revenue, or the like) may be assigned to each event in the timeline 102, include events prior to the reference event 104(4) and events subsequent to the reference event 104(4).

Each event in the timeline 102 influences subsequent events, including reference events (e.g., purchases), similar to how each layer in a neural network influences the next layer, or similar to how incremental observations influence belief in Bayesian networks. Rather than try to identify relationships of the events to each other, the relationships of the events in the timeline 102 are related to a common value, e.g., the Value Index (VI) 106. The single value VI 106 is similar to a single output node in a neural network, or to a Bayesian belief value in a Bayesian Network. The value of VI 106 is tied to quantifiable transactions, such as the reference event 104(4). For example, the purchase of an item valued at $30,000 may be used to assign the VI 106 the value of $30,000.

An algorithm may move backward 110 through the timeline 102 and assign relative (e.g., contributory) values to the prior events (e.g., 104(3), 104(2), and 104(1)). The algorithm may move forward 112 and assign relative (contributory) values to the subsequent events (e.g., 104(5) to 104(M)).

After determining the VI 106, the timeline 102 may be modeled as a set of sub-sequences (e.g., portions of the timeline 102) yielding a value for the VI based on the reference event 104(4). Using machine learning techniques, the individual contributions 108(3), 108(2), 108(1) of the preceding events 104(3), 104(2), 104(1), respectively, can be estimated, similar to the way that connection weights in a neural network are determined, or similar to the way that the evidentiary weight of facts in a Bayesian network are computed.

Figure 2:
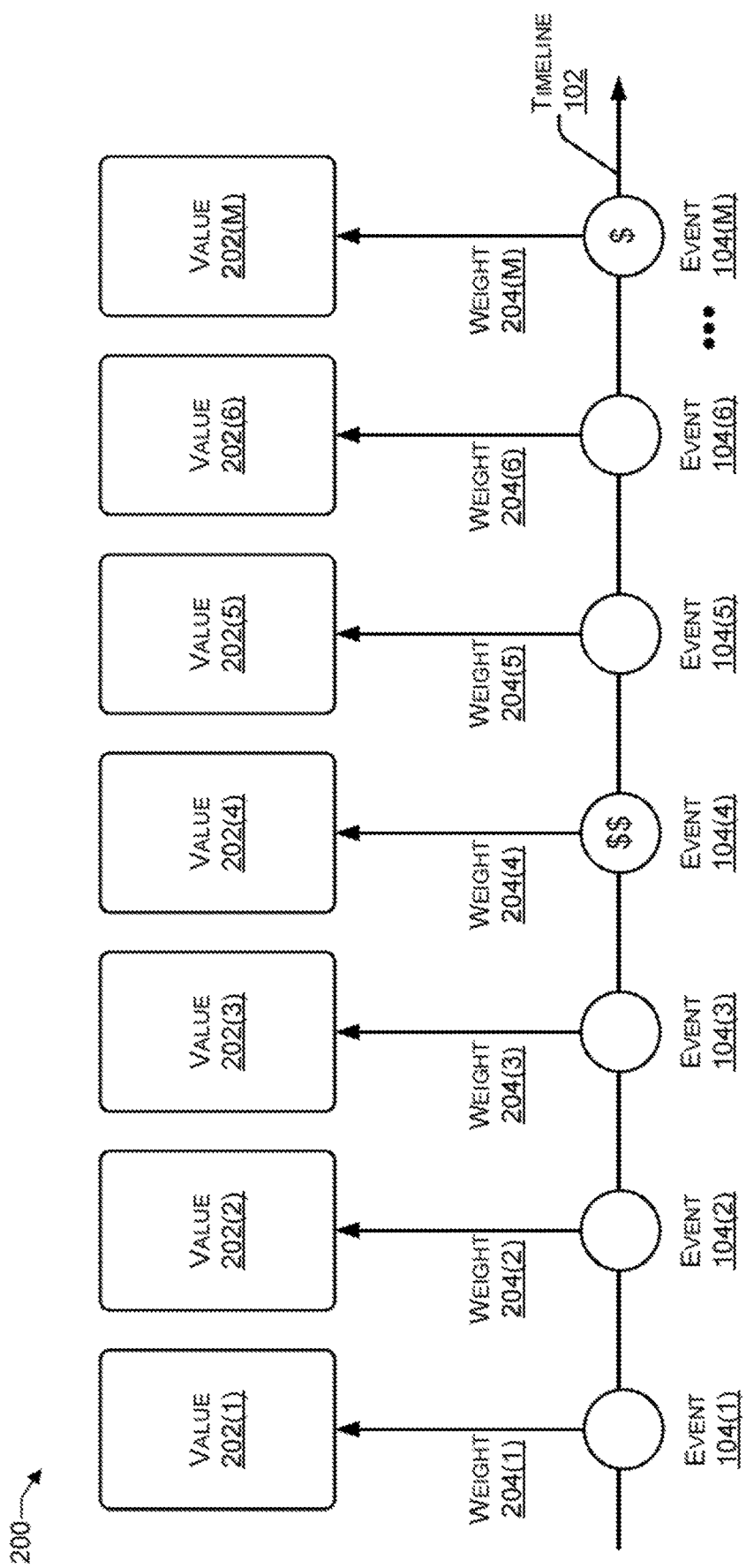
FIG. 2 is a block diagram illustrating determining a value for events in an event timeline according to some embodiments.

FIG. 2 is a block diagram 200 illustrating determining a value for events in an event timeline according to some embodiments. A value index 202(4) may be determined for the reference event 104(4). Machine learning may be used to estimate the contributions 108 of individual events.

An incremental (e.g., contributory) value 202 may be determined for each non-reference event in the timeline 102. For example, value 202(1) may be determined for event 104(1), value 202(2) may be determined for event 104(2), and so on (excluding the reference event 104(4)) up to determining value 202(M) for event 104(M). After the values 202 have been determined (e.g., estimated using machine learning) for each event in the timeline 102, the algorithm may go back through the timeline 102 to determine (e.g., estimate using machine learning) event weights 204, using sub-sequences of the timeline 102. A sub-sequence of the timeline 102 is a portion of the timeline 102 that includes at least one reference event. For example, in FIG. 1, events 104(1) to 104(4) may be a sub-sequence of the timeline 102 that includes the reference event 104(4).

Thus, each event 104 is assigned a value 202. The value 202 of each event 104 may be considered a component of the value of one or more subsequent events. The values 202 can be used by a vendor to tailor marketing, sales, and other activities for an individual consumer, based on which of the events 104 have a higher weight 204 (e.g., higher value) for an individual consumer. For example, if the weight 204(1) of the visit to the website (event 104(2)) is consistently small (e.g., less than a threshold amount) across multiple timelines, the low value placed by the customer on the visit to the website may indicate the need to review and redesign the website for a better customer experience.

Figure 4:
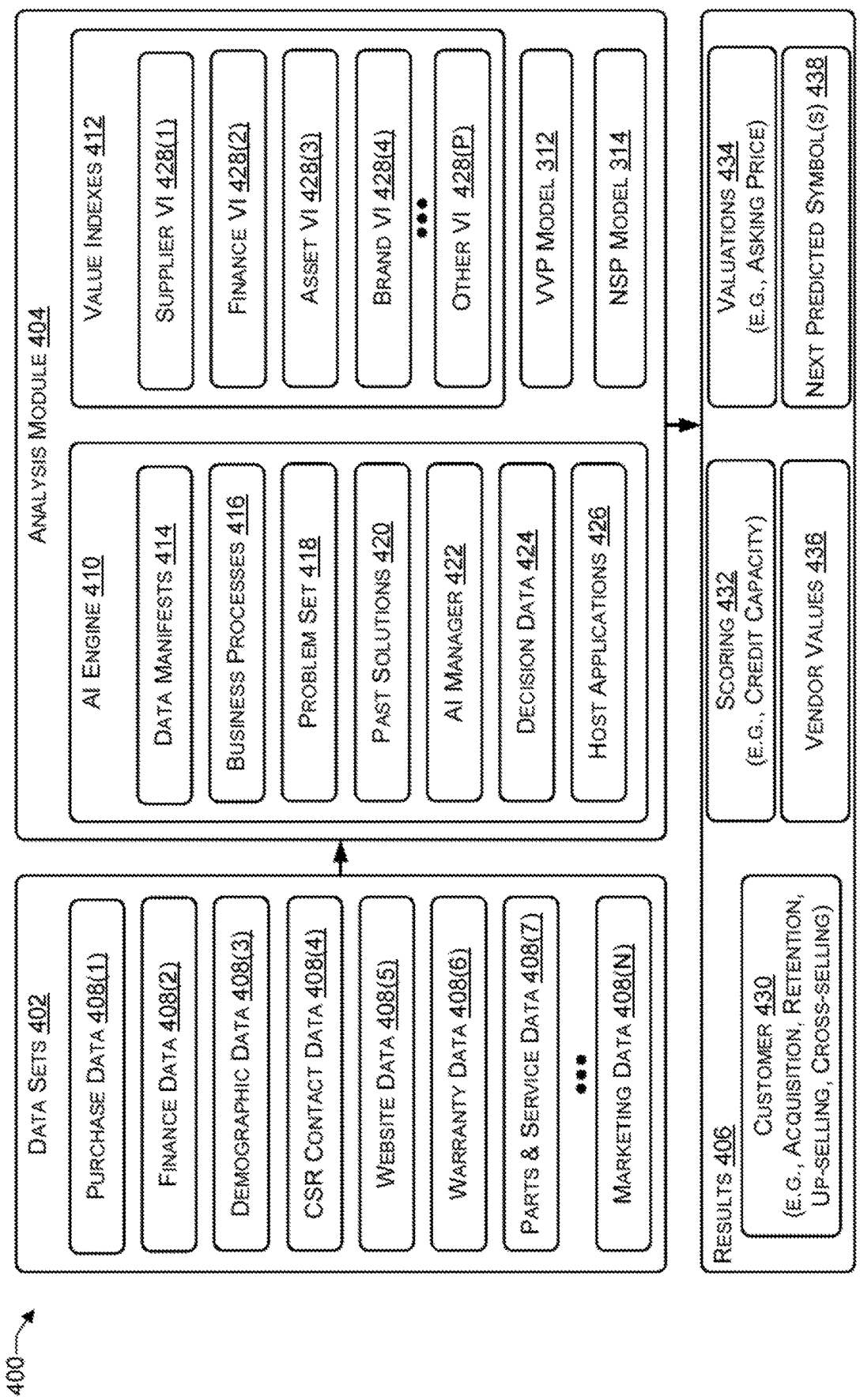
FIG. 4 is a block diagram illustrating an architecture to analyze event timelines according to some embodiments.

The various uses of value indexes are discussed further in FIG. 4. The accuracy of the value indexes increases as the amount of data associated with the vendor-customer relationship increases, e.g., more data means more accurate value indexes. Much of the vendor-customer relationship data can be gathered from various enterprise software systems that are used to store information about a customer and information obtained from third party services (e.g., FICO score). In some cases, additional information about the vendor-customer relationship may be augmented using data from customer activities on social network, internet forum postings, relevant news items, macroeconomic data and forecasts, and the like.

For example, a vendor may, based on the value indexes of financial transactions associated with the customer, provide the customer with credit offerings specifically tailored to the customer's preferences and based on the customer's ability to service the corresponding debt. As a second example, a real estate agent may determine the order in which to show the features of residential real estate properties to a prospective customer, to reduce the time to make a purchase decision. In this example, information collected from previous and current listings as well as the preferences of the customer (e.g., based on ratings of the listings offered) may be used. To illustrate, the real estate agent may send the customer a set of property listings. The buyer may examine and rate (e.g., love it, hate it, want to see it each property listing), write comments about at least a portion of the listings, and the like. By analyzing the contributory value indexes, such as listing price, square footage, number of bedrooms, number of bathrooms, yard size, the customer ratings of each property listing, the comments, and the like, the customer's tastes in a house as well as the customer's financial affinity can be determined. The customer's tastes and financial affinity can be used to identify which features the customer values and used to present properties to the customer. For example, if a determination is made that the customer values yard size higher than other factors, the customer may be shown the front yard and backyard, before taking the customer into the house. If a determination is made that the customer values listing price over other factors, then the customer may be shown a set of properties in a particular order (e.g., based on ascending listing price).

Vendor Value Prediction (VVP) Model

Figure 3:
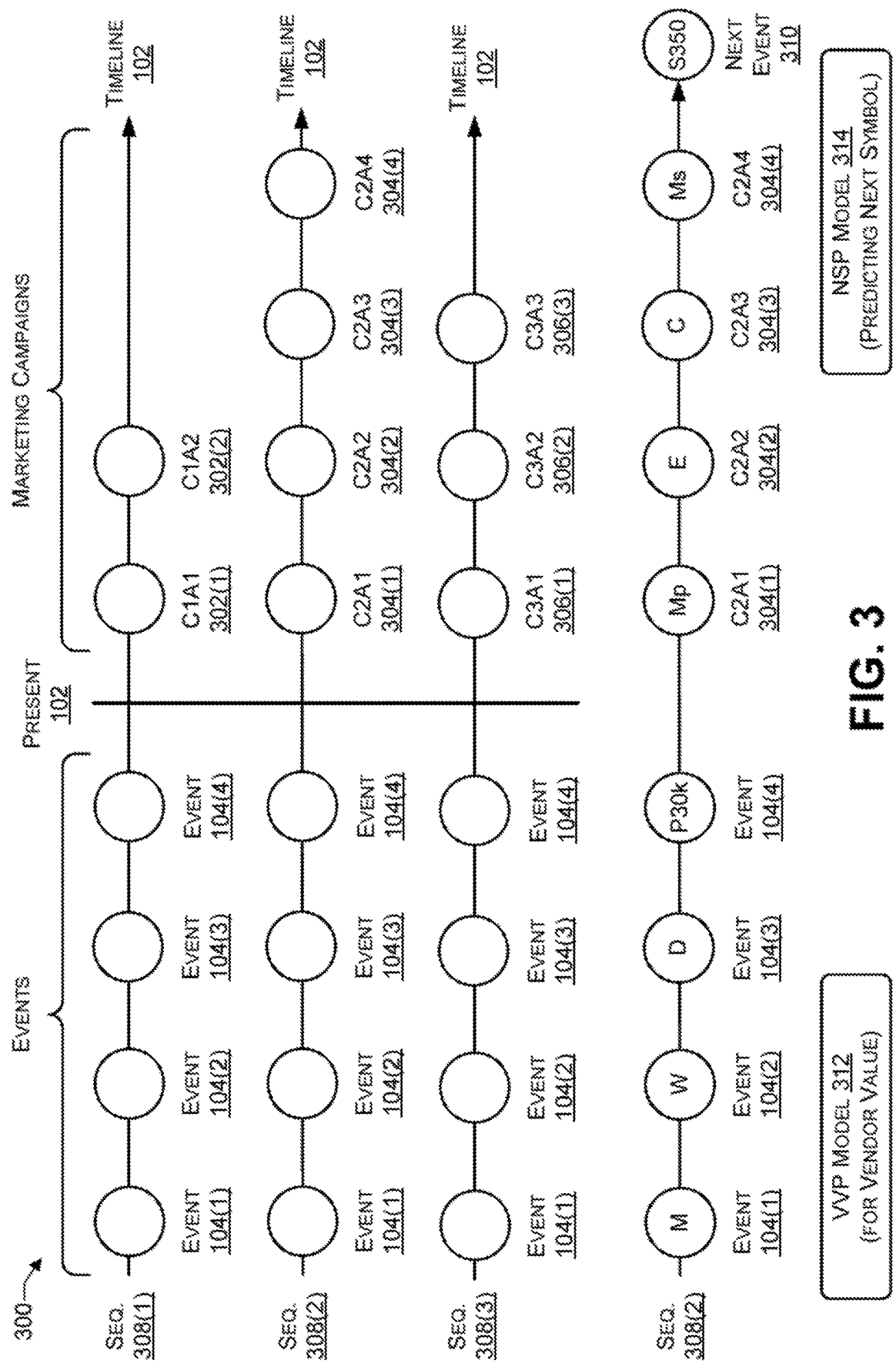
FIG. 3 is a block diagram illustrating an example of evaluating multiple campaigns and predicting a next event in an event timeline according to some embodiments.

FIG. 3 is a block diagram 300 illustrating an example of evaluating multiple campaigns and predicting a next event in an event timeline according to some embodiments. In this example, the event timeline 102 of the customer (or potential customer) includes four events. For example, the event 104(1) (labeled "M" in FIG. 3) may be an action such as a vendor (e.g., supplier, retailer, distributor, or the like) sending a mailer to an individual, the event 104(2) (labeled "W") may be a first event such as the individual visiting a website, the event 104(3) (labeled "D") may be a second event such as the individual visiting a dealer or retailer, and the event 104(4) (labeled "P30k") may be a reference event, such as a revenue event in which the customer makes an acquisition (e.g., purchase, lease, or the like) of a product or a service having a currency amount that satisfies a predetermined threshold. In this example, assume the individual purchased a used car for $30,000 (e.g., abbreviated P30k) and the car dealer has three potential marketing campaigns to motivate the purchaser to come to the car dealer to have the car serviced.

In FIG. 3, three marketing campaigns are evaluated by adding each campaign to the customer's event timeline. The marketing campaigns being evaluated include a first campaign 302 (C1 has two marketing actions A1 and A2 by a vendor), a second campaign 304 (C2 has four marketing actions A1, A2, A3, and A4 by a vendor), and a third campaign 306 (C3 has three marketing actions A1, A2, and A3 by a vendor). Each of the marketing campaigns 302, 304, and 306 are added to the customer's event timeline (e.g., events 104) to create three virtual sequences that are evaluated by a trained machine learning model, VVP model 312. For example, adding the first marketing campaign 302 to the event timeline 102 creates the sequence 308(1), adding the second marketing campaign 304 to the event timeline 102 creates the sequence 308(2), and adding the third marketing campaign 306 to the event timeline 102 creates the sequence 308(3). Each of the sequences 308 may be evaluated using the VVP model to determine the vendor value (e.g., how much value the customer places on the vendor) for each action in the marketing campaign. The vendor value associated with each action in the marketing campaign indicates the relative success (or failure) of each action while the ending vendor value at the end of each marketing campaign indicates the total predicted vendor value after the marketing campaign has concluded.

Assume the event 104(1) includes mailing a postcard (e.g., or another type of printed materials) to an individual (e.g., customer or potential customer), the event 104(2) includes the individual visiting the vendor's website, the event 104(3) includes the individual visiting the vendor (e.g., visiting an automobile dealership), and the event 104(4) includes a purchase (e.g., purchase of a car).

In the marketing campaign 304, the first action C2A1 304(1) may include sending a mailer with a promotional coupon ("Mp" in FIG. 3) for a discount on parts and service. The cost for the first action C2A1 304(1) may be $1.50 for designing, printing, and mailing a postcard mailer. The first action C2A1 304(1) may be predicted by the VVP model 312 to increase the vendor value to the individual by $3000.

The second action C2A2 304(2) may include emailing a coupon ("E" in FIG. 3) for a discount on parts and service. The cost for the second action C2A2 304(2) may be $0.50 for designing and emailing the coupon. The second action C2A2 304(2) may be predicted by the VVP model 312 to increase the vendor value to the individual by $1000.

The third action C2A3 304(3) may include calling ("C" in FIG. 3) the customer as a follow-up to the purchase to determine if the individual was satisfied with the car purchase and to verbally offer a discount on parts and service. The cost for the third action C2A3 304(3) may be $2.50 (e.g., 15 minutes of time of a $10/hour employee) to call the customer. However, the individual's past behavior may indicate that the individual does not enjoy (e.g., place a value on) being contacted by phone. The third action C2A3 304(3) may be predicted by the VVP model 312 to decrease the vendor value to the individual by $2000.

The fourth action C2A4 304(4) may include sending a mailer (labeled "Ms" in FIG. 3) with a coupon for a discount on a seasonal service (e.g., air conditioning tune-up prior to the summer months or a winterizing tune-up prior to the winter months). The cost for the fourth action C2A4 304(4) may be $0.50 to design and email the coupon. The individual may have previously experienced a seasonal issue, such as the air conditioning malfunctioning during the summer months on a previous vehicle or the previous car not starting in the winter because oil with a higher viscosity had not been added to the engine. The fourth action C2A4 304(4) may be predicted by the VVP model 312 to increase the vendor value to the individual by $10,000.

The VVP model 312 predicts that the result of executing the second marketing campaign (C2) 304 is an increase in vendor value of $3,000+$1,000−$2,000+$10,000=$12,000. Thus, the vendor value is predicted to increase after the marketing campaign from $30,000 (purchase of the car) to $42,000, indicating that the customer values the vendor more after the marketing campaign and is therefore more likely to make additional purchases at the car dealer (e.g., vendor). Total cost for the 2nd campaign (C2) 304 is $1.50+$0.50+$2.50+$0.50=$5.00.

Assume that in the first campaign 302, C1A1 302(1) is the same as C2A1 304(1) in the second campaign (e.g., sending a mailer with a coupon) and C1A2 302(2) is the same as C2A2 304(2) in the second campaign (e.g., sending an email coupon). Assume that in the third campaign 306, C3A1 306(1) is the same as C2A1 304(1) in the second campaign (e.g., sending a mailer with a coupon), C3A2 306(2) is the same as C2A2 304(2) in the second campaign (e.g., sending an email coupon), and C3A3 306(3) is the same as C2A3 304(3) in the second campaign (e.g., vendor's representative calling the individual). In the aforementioned scenario, the results of analyzing the three marketing campaigns using the trained model 312 may be as follows:

TABLE 1

|  | Total Cost to Execute Campaign | Change in Vendor Value |
| --- | --- | --- |
| 1st Campaign (C1) 302 | $2.00 | +$6,000 |
| 2nd Campaign (C2) 304 | $5.00 | +$12,000 |
| 3rd Campaign (C3) 306 | $4.50 | +$2,000 |

Based on Table 1, the VVP model 312 predicts that the second campaign 304 may provide the greatest increase in the vendor's value to the individual. In addition, because the analysis indicates that the vendor value is decreased by C2A3 304(3) (e.g., calling the individual), the vendor may remove this action from the marketing campaign. Modifying the campaign to remove C2A3 304(3) may result in a lower cost, e.g., $2.50 instead of $5.00 and an increase in vendor value, e.g., $14,000 instead of $12,000. In this way, the vendor can modify a marketing campaign by selecting those actions that stay within the vendor's budget and which provide an increase in the vendor value, while not performing actions that are expensive and either do not significantly (e.g., more than a threshold amount) increase the vendor value or negatively impact the vendor value. In some cases, the vendor may "mix and match" actions from multiple marketing campaigns, e.g., selecting one or more actions from a first virtual marketing campaign, selecting one or more actions from a second virtual marketing campaign, selecting one or more actions from a third virtual marketing campaign, and so on.

Next Symbol Prediction (NSP) Model

Assigning a symbol to each event that previously occurred in the customer's journey (e.g., event timeline), a string of symbols may be created. For example, the symbol M may represent the event 104(1) in which the individual receives a mailer (e.g., brochure), the symbol W may represent the event 104(2) in which the individual visits the vendor's website, the symbol D may represent the event 104(3) in which the individual visits the car dealer, and the symbol P30k may represent the event 104(4) in which the individual purchases a car for $30,000. Thus, the individual's event timeline may be represented as the string of symbols M-W-D-P30k.

The vendor may have data from a call center (or telephone system), customer relationship manager (CRM) software, click through rate (CTR), and the like from which the vendor can extract a set of customer event timelines associated with multiple customers. The vendor may use a software program to automatically convert the set of customer event timelines into a corresponding set of symbol strings. The vendor may use the set of symbol strings as training data to train a next symbol predictor (NSP) model 314 to predict a next event in an augmented event timeline.

Each virtual marketing campaign may be converted into a string of symbols prior to having a trained model 312 analyze the marketing campaigns. For example, in the second marketing campaign 304, the first action C2A1 304(1) of sending a mailer with a promotional coupon may be represented by the symbol "Mp", the second action C2A2 304(2) of emailing a coupon may be represented by the symbol "E", the third action C2A3 304(3) of calling may be represented by the symbol "C", and the fourth action C2A4 304(4) of sending a mailer for a discount on a seasonal service may be represented by the symbol "Ms". Thus, the second marketing campaign 304 may be represented by the string of symbols "Mp-E-C-Ms".

The string of symbols (e.g., M-W-D-P30k) representing the customer's event timeline may be augmented using the string of symbols (e.g., Mp-E-C-Ms) representing the actions in the marketing campaign to create an augmented string of symbols (e.g., M-W-D-P30k-Mp-E-C-Ms). The NSP model 314 may analyze the augmented string of symbols and predict one (or more) next symbols. For example, in FIG. 3, the NSP model 314 may predict that in a next event 310 the vendor services the individual's car resulting in revenue of $350 (represented symbolically as S350). In this way, the NSP model 314 may, for each marketing campaign, predict whether the next event (or next set of events) includes a revenue event and predict how much revenue will be received. For example, in Table 1, an expected revenue column may be added, with the first campaign 302 predicted to yield $100, the second campaign 304 predicted to yield $350, and the third campaign predicted to yield $200.

Architecture

FIG. 4 is a block diagram illustrating an architecture 400 to analyze event timelines according to some embodiments. In the architecture 400, multiple data sets 402 may be analyzed by an analysis module 404 to produce one or more results 406.

For example, the data sets 402 may include purchase data 408(1), finance data (e.g., associated with consumer financing) 408(2), demographic data (e.g., customer's age, income, zip code, and the like) 408(3), CSR contact data (e.g., why, when, and how the customer has contacted a CSR) 408(4), website access data (e.g., what type of information the customer obtains from the website) 408(5), warranty data 408(6) (e.g., warranty claim is indicative of certain customer activities), parts and service data 408(7), and marketing data 408(N) (e.g., how the customer has been provided marketing), where N>0. Of course, the data sets 402 may include other types of customer-related data.

The analysis module 404 may include an artificial intelligence (AI) engine 410 to perform an analysis of the data sets 402 and to determine the value indexes 404 based on the analysis. The analysis module 404 may include the VVP model 312. The analysis module 404 may include the NSP model 314. AI engine 410 may use machine learning, such as a classifier, to analyze the data sets 402 to determine value indexes 412. Data manifests 414 may identify where each of the data sets 402 are stored and how they are accessed. Business processes 416 may identify various business processes, such as customer relationship management (CRM), of a supplier. In some cases, the supplier may modify a particular one of the business processes if a majority of customers have a low value for the particular business process. Problem set 418 may define the problem(s) to be solved by the analysis module 404 and may be used with a context engine to correlate the problem set to past solutions. An AI manager 422 may manage the various processes to derive the value indexes 412. The decision data 424 may include a list of customer prospects, offers to be made, and preferred method of communication, and may be delivered to a salesperson, for example, through a customer relationship manager (CRM) system or email.

The value indexes 412 may include a supplier VI 428(1) associated with each supplier, a finance VI 428(2) including value indexes related to up-selling and cross-selling, an asset VI 428(3) including value indexes of assets (e.g., property, products, services, and the like) offered by the supplier, brand VI 428(4) identifying the value that each customer places on each supplier's brand, and other VIs 428(P) (where P>0) associated with each supplier.

The results 406 may include customer 430 related information, scoring 432, and valuations 434. The customer data 430 may include information, such as how to acquire particular types (e.g., income greater than X) of customers based on their values, how to retain customers based on their values, how to sell (e.g., new sales, up-sell, and cross-sell) to customers based on their values, etc. The scoring 432 may be information related to customer credit cores, such as the FICO® score, the customer's credit capacity, etc. For example, the scoring 432 may be used to present property listings that have listing prices within the customer's credit capacity. The valuations 434 may include how to present real-estate listings to a customer to reduce the time taken by the customer to make an offer, which vehicles to show a customer based on their values, etc. The valuations 434 may include (i) how to calculate an asking price and an expected days on market to a seller of a real estate property, (ii) an appraisal value of the property (e.g., for mortgage approval or a valuation of a bank's mortgage portfolio), (iii) how to present real-estate listings to a customer to reduce the time taken by the customer to make an offer, (iv) which vehicles to show a customer based on the customer's values, etc. The results 406 may include vendor values 436 predicted by the VVP model 312. The results 406 may include next predicted symbols 438 predicted by the NSP model 314.

Flow Diagrams

In the flow diagrams of FIGS. 5, 6, 7, 8, and 9, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 500, 600, 700, 800, and 900 are described with reference to FIGS. 1, 2, 3, and 4 as described above, although other models, frameworks, systems and environments may be used to implement these processes.

VVP Model—Training and Usage

Figure 5:
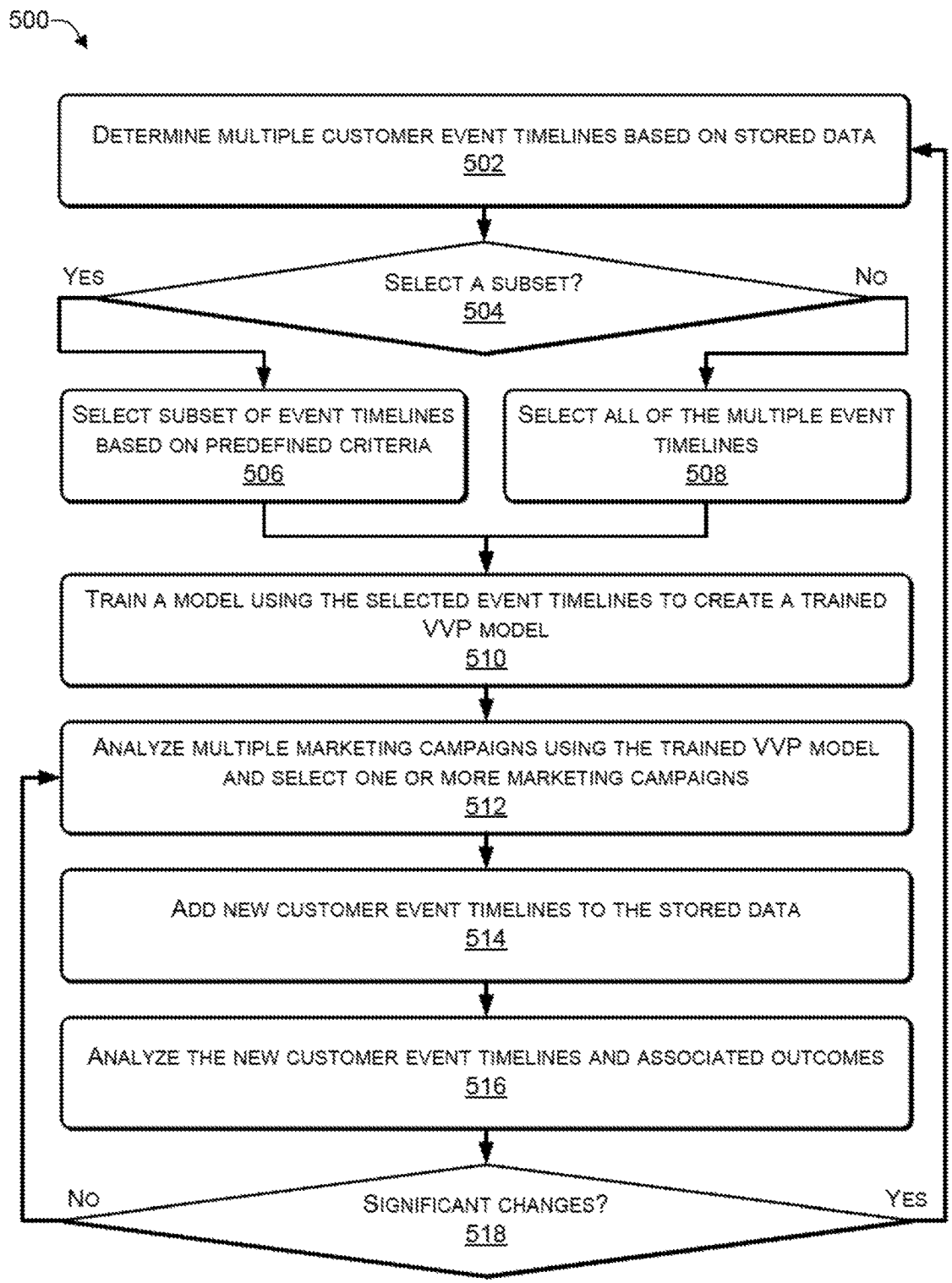
FIG. 5 is a flowchart of a process that includes training a production model according to some embodiments.

FIG. 5 is a flowchart of a process 500 that includes training a VVP model according to some embodiments. The process 500 may be performed by a software module, such as the analysis module 404 of FIG. 4. For example, after being trained, the VVP model 312 may perform other processes, such as, for example, the process 600.

At 502, the process 500 may access customer-related data stored by the vendor on one or more systems (e.g., CRM, call-center, phone system, CTR data from the vendor's website, email server, and the like) and extract multiple event timelines, such as the representative event timeline 102.

At 504, a determination may be made whether to select a subset of the customer event timelines. In response to determining, at 504, that yes, a subset is to be selected, the process may proceed to 506, where a subset of the event timelines may be selected based on predefined criteria, and the process may proceed to 510. In response to determining, at 504, that no, a subset is not to be selected, the process may proceed to 508, where all of the event timelines may be selected, and the process may proceed to 510. For example, the cost (e.g., computational cost and/or monetary cost to acquire computational resources) to process the multiple (e.g., millions) event timelines extracted from the data in 502 may exceed a threshold amount. To illustrate, processing all the event timelines may require 48 hours of computational resources, or thousands of dollars to rent virtual processing power from a cloud provider. In such cases, a subset of the event timelines may be selected. As another example, the vendor may specify criteria to target one or more specific market segments. The criteria may include factors such as age (or age range), gender, race, language spoken, location (e.g., postal code, neighborhood, city, state, and the like), income, previous purchases from the vendor, previous purchases from other vendors, appraised value of house, and the like.

At 510, a model may be trained using the event timelines to create a trained VVP model (e.g., the VVP model 312 of FIG. 3). At 512, multiple marketing campaigns may be analyzed using the VVP model and one or more marketing campaigns may be selected from among the multiple marketing campaigns. For example, the analysis of the VVP model may predict the vendor value after performing each action in each marketing campaign as well as the total change in the vendor value at the end of the marketing campaign. The one or more marketing campaigns may be selected based on the ending vendor values of each marketing campaign and the cost associated with each marketing campaign (e.g., see FIG. 3). The process of using the VVP model to analyze and select marketing campaigns is described in more detail in FIGS. 6 and 7.

At 514, new customer event timelines may be added to the stored data. For example, the vendor may continue to acquire additional customer data (e.g., from CRM, CTR, email server, call center, telephone system, web chat system, and the like) and, at a predetermined interval (e.g., monthly, quarterly, yearly), add the additional data to the stored data.

At 516, the new customer event timelines and associated outcomes may be analyzed. At 518, a determination may be made whether the new customer event timelines and associated outcomes differ (e.g., have changed) from previously stored event timelines and outcomes by more than a threshold amount. In response to determining, at 518, that no, the changes in the new event timelines and outcomes are not significant, the process may proceed to 512, where multiple virtual marketing campaigns may be analyzed using the VVP model and a subset of the virtual marketing campaigns may be selected for implementation. In response to determining, at 518, that yes, the changes in the new event timelines and outcomes are significant, the process may proceed to 502, where multiple customer event timelines may be determined based on the stored data that has been updated to include the new customer event timelines and associated outcomes.

Figure 6:
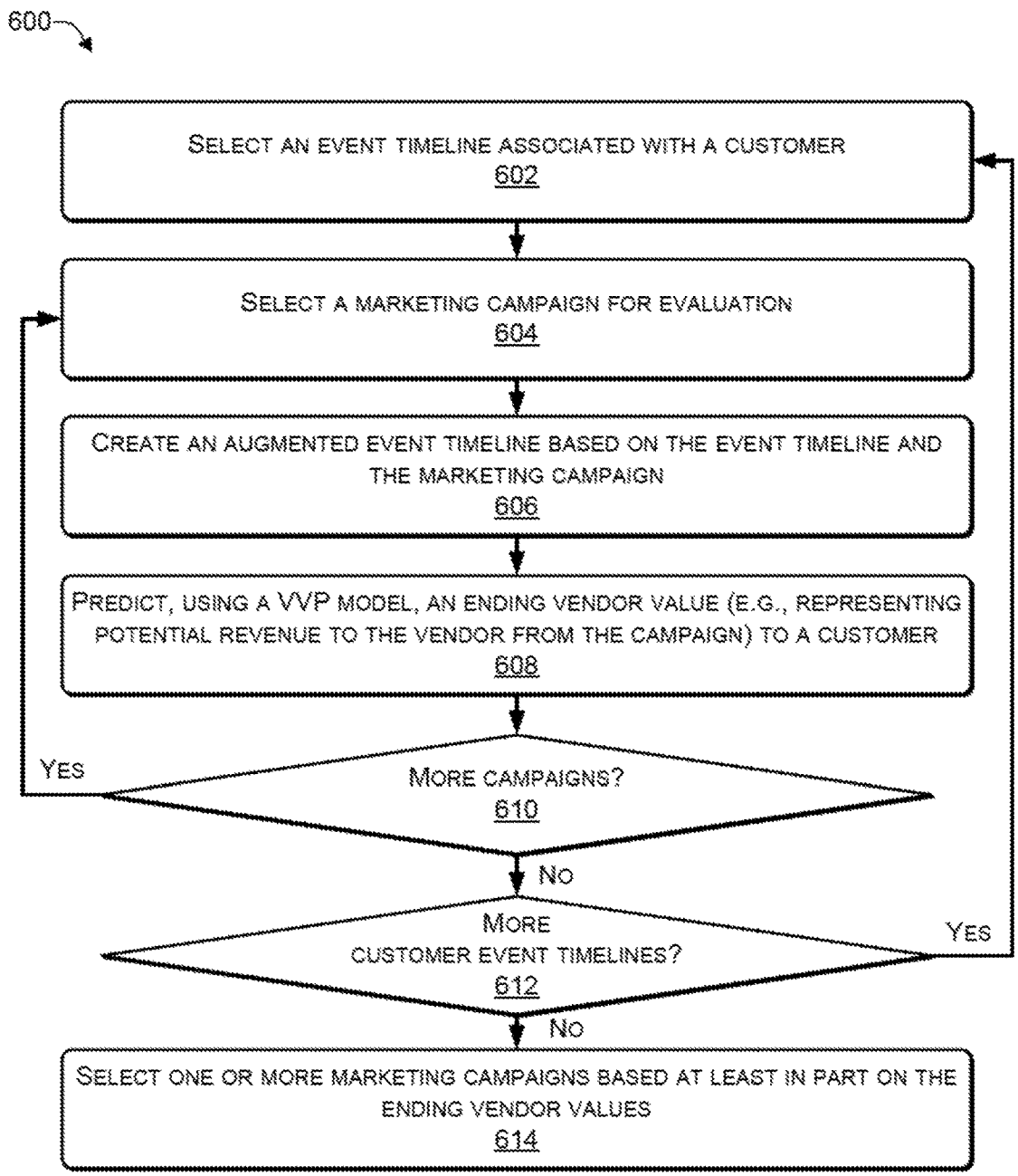
FIG. 6 is a flowchart of a process to create augmented event timelines according to some embodiments.

FIG. 6 is a flowchart of a process 600 to create augmented (e.g., augmented by a marketing campaign) event timelines according to some embodiments. The process 600 may be performed by the VVP model 312 of FIG. 3.

A marketing campaign is a sequence of one or more actions performed by (or on behalf of) a vendor (e.g., a supplier of goods and/or services) over a particular period of time. The actions may be performed using one or more channels. To assess the effectiveness of marketing campaigns, each marketing campaign is added to each customer's event timeline to create augmented event timelines, and the VVP model is used to analyze the augmented event timelines to determine a total change in vendor value at the end of the augmented event timeline (e.g., the ending vendor value). Computational complexity may be higher when training the VVP model (e.g., as described in FIG. 5) but training is done infrequently (e.g., initially and then subsequently when new event timelines and outcomes diverge from previous event timelines and outcomes by more than threshold amount). Analyzing each augmented timeline involves running the VVP model once on the features representing the event timeline, multiplied by the number of customers in the target population, multiplied by the number of campaigns being considered.

At 602, a customer event timeline may be selected (e.g., retrieved from data storage). At 604, a marketing campaign may be selected for evaluation. At 606, the actions of the marketing campaign may be added to the event timeline to create an augmented event timeline. At 608, a VVP model (e.g., the VVP model 312 of FIG. 3) may be used to predict a value of the vendor to the customer, e.g., after the marketing campaign has ended (e.g., the ending vendor value) and, in some cases, after each action in the marketing campaign. For example, in FIG. 3, the event timeline 102 may be augmented using the second campaign 304 to create the augmented sequence 308(2). The VVP 312 may analyze the augmented sequence 308(2) to determine (i.e., predict) the value of the vendor after the marketing campaign has ended and, in some cases, after each action in the marketing campaign. For example, the VVP model 312 may predict that (1) the first action C2A1 304(1) increases the vendor value by $3000, (2) the second action C2A2 304(2) increases the vendor value by $1000, (3) the third action C2A3 304(3) decreases the vendor value by $2000, and (4) the fourth action C2A4 304(4) increases the vendor value by $10,000. Thus, the VVP model 312 predicts that executing the second marketing campaign (C2) 304 will increase vendor value by $3,000+$1,000−$2,000+$10,000=$12,000. Thus, the ending vendor value after the marketing campaign may be predicted to increase from $30,000 (purchase of the car) to $42,000.

At 610, if a determination is made that yes, there are more campaigns, then the process proceeds to 604, where a next marketing campaign is selected for evaluation (e.g., analysis by the trained model). At 610, if a determination is made that no, there are no more campaigns, then process proceeds to 612, where a determination is made whether there are more customer event timelines.

If a determination is made, at 612, that there are more customer event timelines, then the process proceeds to 602, where a next customer event timeline is selected. If a determination is made, at 612, that there are no more customer event timelines, then the process proceeds to 614, where one or more marketing campaigns are selected (e.g., as described in more detail in FIG. 7). For example, in FIG. 3, three marketing campaigns are evaluated and the second marketing campaign selected for deployment because the second marketing campaign provides the highest revenue and the cost is within the vendor's budget.

Figure 7:
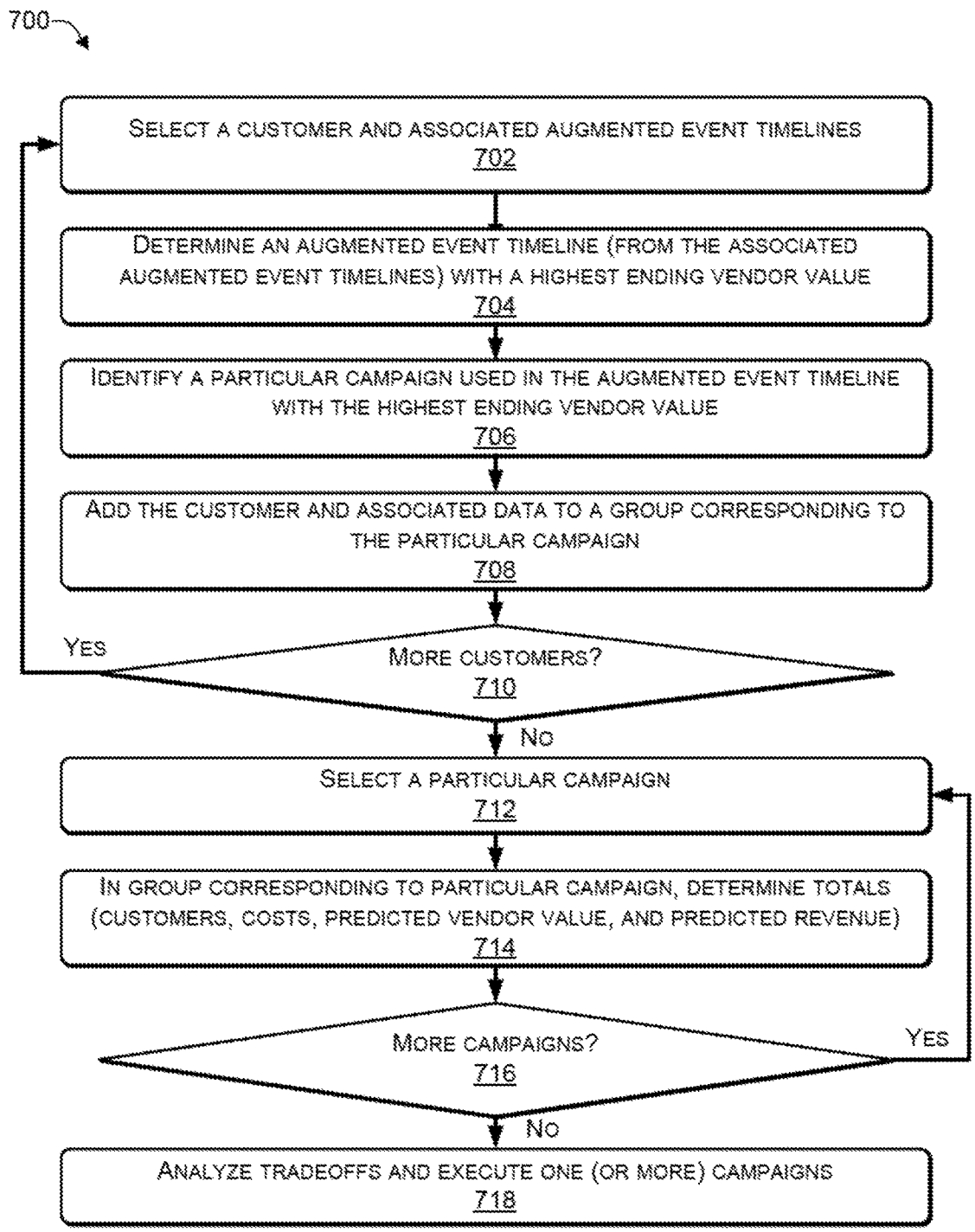
FIG. 7 is a flowchart of a process to group customers that respond to a particular marketing campaign in a similar manner according to some embodiments.

FIG. 7 is a flowchart of a process 700 to group customers that respond to a particular marketing campaign in a similar manner according to some embodiments. The process 700 may be performed by a software module, such as the analysis module 404 of FIG. 4. The process 700 may be performed after multiple marketing campaigns have been evaluated by the VVP model 312 of FIG. 3 to determine the ending vendor value for each marketing campaign.

There are several strategies to select a marketing campaign, where a marketing campaign includes one or more actions that are performed by the vendor (or by a representative on behalf of the vendor) to target a particular set of customers. For example, a single marketing campaign may be selected to be performed to all customers (or a subset thereof). As another example, multiple campaigns may be selected, with each campaign targeting a particular subset of the population, including very small subsets (e.g., a single individual). As yet another example, one or more marketing actions may be selected from at least two different marketing campaigns and combined to create a new marketing campaign. As a further example, a marketing campaign may be selected and then modified by adding marketing actions (e.g., those that increase vendor value) from other marketing campaigns, deleting marketing actions that are predicted to result in less than a threshold increase to vendor value (including marketing actions predicted to negatively affect vendor value), and the like. Various tradeoffs and/or criteria may be taken into consideration when selecting one or more marketing campaigns for execution. For example, the tradeoffs and/or criteria may include a cost of each campaign per customer, predicted revenue per customer, predicted customer satisfaction, and the like. The process 700 illustrates one particular campaign selection strategy. Of course, other types of criteria and tradeoffs may be used to select one or more campaigns. The process 700 identifies and groups together each customer for whom a particular (e.g., same) marketing campaign resulted in the highest final vendor value in one of the customer's augmented event timelines. For example, the same marketing campaign may cause a set of customer's augmented event timelines to have the highest final vendor value among those customer's augmented timelines. The process 700 thus identifies each group of customers that have a similar set of preferences, e.g., the customers in the group respond to the particular marketing campaign in a similar way (e.g., primarily positively) resulting in a highest vendor value among all marketing campaigns.

At 702, a customer may be selected from a group of customers whose augmented timelines were evaluated (e.g., using the VVP model 312 of FIG. 3). At 704, the customer's augmented event timeline with the highest predicted ending vendor value (from among all of the customer's augmented event timelines) may be determined. At 706, the particular marketing campaign used in the augmented event timeline with the highest predicted ending vendor value may be identified. At 708, the customer and data associated with the campaign, such as campaign costs, predicted ending vendor value, expected revenue, and the like, may be added to a group associated with the particular campaign. Thus, each marketing campaign may have a corresponding group.

At 710, a determination may be made if there are more customers. If the determination at 710 is yes, then the process proceeds to 702, where a next customer is selected. If the determination at 710 is no, then the process proceeds to 712.

At 712, a particular campaign is selected. At 714, the group corresponding to the campaign may be analyzed to determine the totals for that group, such as, for example, the total number of customers in the group, the total costs associated with marketing the campaign to the customers in the group, the total predicted ending vendor value, the total predicted revenue that the campaign may generate, and the like.

At 716, a determination may be made whether there are more campaigns. If the determination at 716 is yes, then the process proceeds to 712 where a next campaign is selected. If the determination at 716 is no, then the process proceeds to 718 where tradeoffs between the campaigns are analyzed and one or more campaigns are selected for execution (e.g., deployment). For example, the tradeoffs between marketing costs and predicted revenue may be examined to identify the marketing campaigns that target specific customer groups, resulting in the highest predicted revenue (e.g., without regard to cost), the highest predicted revenue per dollar (e.g., highest revenue with lowest costs), total predicted revenue when costs are kept within a predetermined marketing budget, and the like.

At the end of the process 700, the customers may be grouped into multiple groups (corresponding to the multiple marketing campaigns), with each group including a set of customers that were predicted to respond similarly to the corresponding marketing campaign along with the costs to execute the corresponding marketing campaign, the predicted ending vendor value, the predicted revenue which the corresponding marketing campaign will generate, and the like. As an example, use campaigns 302, 304, and 306 of FIG. 3. Assume the event timelines of 60,000 individuals were analyzed by augmenting each customer's event timeline with each of the campaigns 302, 304, and 306 to create 180,000 augmented event timelines. The augmented event timelines may be analyzed using the VVP model 312 to determine a predicted ending vendor value. A group corresponding to each marketing campaign may be created. For each individual of the 60,000 individuals, the associated three augmented timelines may be analyzed to identify the particular augmented event timeline with the highest ending vendor value. The particular marketing campaign with which the particular event timeline was augmented may be identified. The individual (along with associated data, such as cost, ending vendor value, etc.) may be added to the group corresponding to the particular marketing campaign. Assume a first group corresponding to the first marketing campaign includes 5,000 individuals, a second group corresponding to the second marketing campaign includes 35,000 individuals, and a third group corresponding to the third marketing campaign includes 20,000 individuals. The vendor may analyze the total vendor values and costs for each group and weigh various tradeoffs to determine which marketing campaign(s) to deploy. For example, deploying the second and third marketing campaigns may achieve a high total vendor value while going slightly over a marketing budget. The vendor may choose these tradeoffs and decide to allocate additional funds to the marketing budget to achieve the high total vendor value. Deploying the third marketing campaigns may reach fewer people but may achieve a slightly lower total vendor value while also satisfying the marketing budget. The vendor may choose these tradeoffs and decide to stay within the marketing budget. Deploying the second marketing campaigns may reach a larger number of people than the third marketing campaign alone but may achieve a slightly lower total vendor value than the third marketing campaign while also satisfying the marketing budget. The vendor may choose these tradeoffs and decide to reach more people.

NSP Model—Training and Usage

Figure 8:
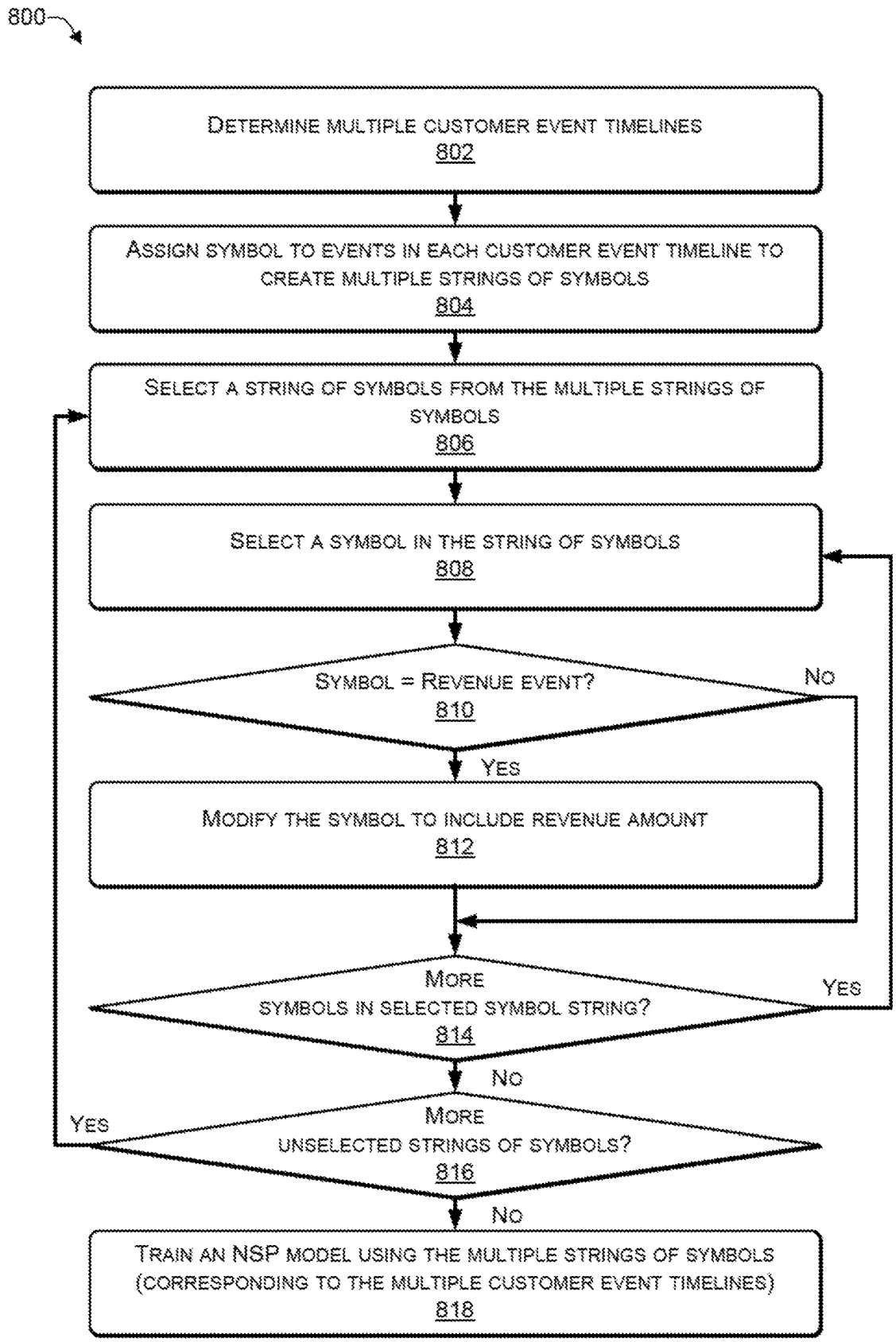
FIG. 8 is a flowchart of a process that includes training a revenue model according to some embodiments.

FIG. 8 is a flowchart of a process 800 that includes training a revenue model according to some embodiments. The process 800 may be performed by a software module, such as the analysis module 404 of FIG. 4.

At 802, the process 500 may access customer-related data stored by the vendor on one or more systems (e.g., CRM, call-center, phone system, CTR data from the vendor's website, email server, and the like) to extract multiple customer event timelines, such as the representative event timeline 102.

At 804, a symbol may be assigned to individual events in each of the customer event timelines, with similar events being assigned the same symbol, to create multiple strings of symbols. For example, in FIG. 3, the symbol M may be assigned to the event 104(1) in which the individual receives a mailer (e.g., brochure), the symbol W may be assigned to the event 104(2) in which the individual visits the vendor's website, the symbol D may be assigned to the event 104(3) in which the individual visits the car dealer, and the symbol P30k may be assigned to the event 104(4) in which the individual purchases a car for $30,000. Thus, the events 104(1), 104(2), 104(3), and 104(4), in the event timeline 102 of FIG. 3 may be represented by the string of symbols M-W-D-P30k. Thus, a string of symbols corresponding to each customer's event timeline may be created. The vendor may define which types of events are to be grouped as a "similar event". For example, the symbol M may be used to represent mailing printed materials (a "mailer"), include a postcard, a brochure, a letter, or another type of printed material. As another example, the symbol Ps may be used for small purchases, e.g., under a threshold amount (e.g., $1000)

while Pl may be used for large purchases greater than or equal to the threshold amount. As yet another example, in some cases, the symbol C may be used for any messaging performed via the customer's cell phone, including text messages and phone calls. In other cases, Ct may be used for text messaging and Cp for phone calls. Thus, the vendor can adjust the granularity of the events by broadly defining particular events to be similar for less granularity and narrowly defining particular events to be similar for more granularity.

At 806, a string of symbols (representing a customer's event timeline) may be selected from the multiple strings of symbols. At 808, a symbol in the string of symbols may be selected. At 810, a determination may be made whether the symbol is a revenue event (e.g., purchase or lease of an item). If the determination at 810 is yes, then the process proceeds to 812 where the symbol is modified to include an amount of revenue associated with the revenue event, and the process proceeds to 814. The modification to include the amount of revenue associated with the revenue event may reflect the actual revenue amount, an order of magnitude of the revenue event (e.g., tens, hundreds, thousands, and the like), a range, or another type of revenue indicator. For example, a purchase of $150 may be represented by the symbol "P150" for actual revenue, PO$10^2$ for a revenue order of magnitude (e.g., 100-999), and P0:200 for revenue in the range $0 to $200. If the determination at 810 is no, then the process proceeds to 814.

At 814, a determination may be made whether there are more symbols in the selected string of symbols. If the determination at 814 is yes, then the process proceeds to 808, where a next symbol in the string of symbols is selected. Thus, the process may repeat 808, 810, 812, and 814 until all the symbols in the selected string of symbols have been selected. If the determination at 814 is no, then the process proceeds to 816.

At 816, a determination may be made whether there are more unselected strings of symbols in the multiple strings of symbols. If the determination at 816 is yes, then the process proceeds to 806 where a next string of symbols is selected. Thus, the process may repeat 806, 808, 810, 812, 814, and 816 until each of the strings of symbols from the multiple strings of symbols have been selected. If the determination at 816 is no, then the process proceeds to 818 where an NSP model is trained using the multiple strings of symbols (e.g., representing the multiple customer event timelines). The NSP model may perform (or be used in) the processes 900 and 1000.

Figure 9:
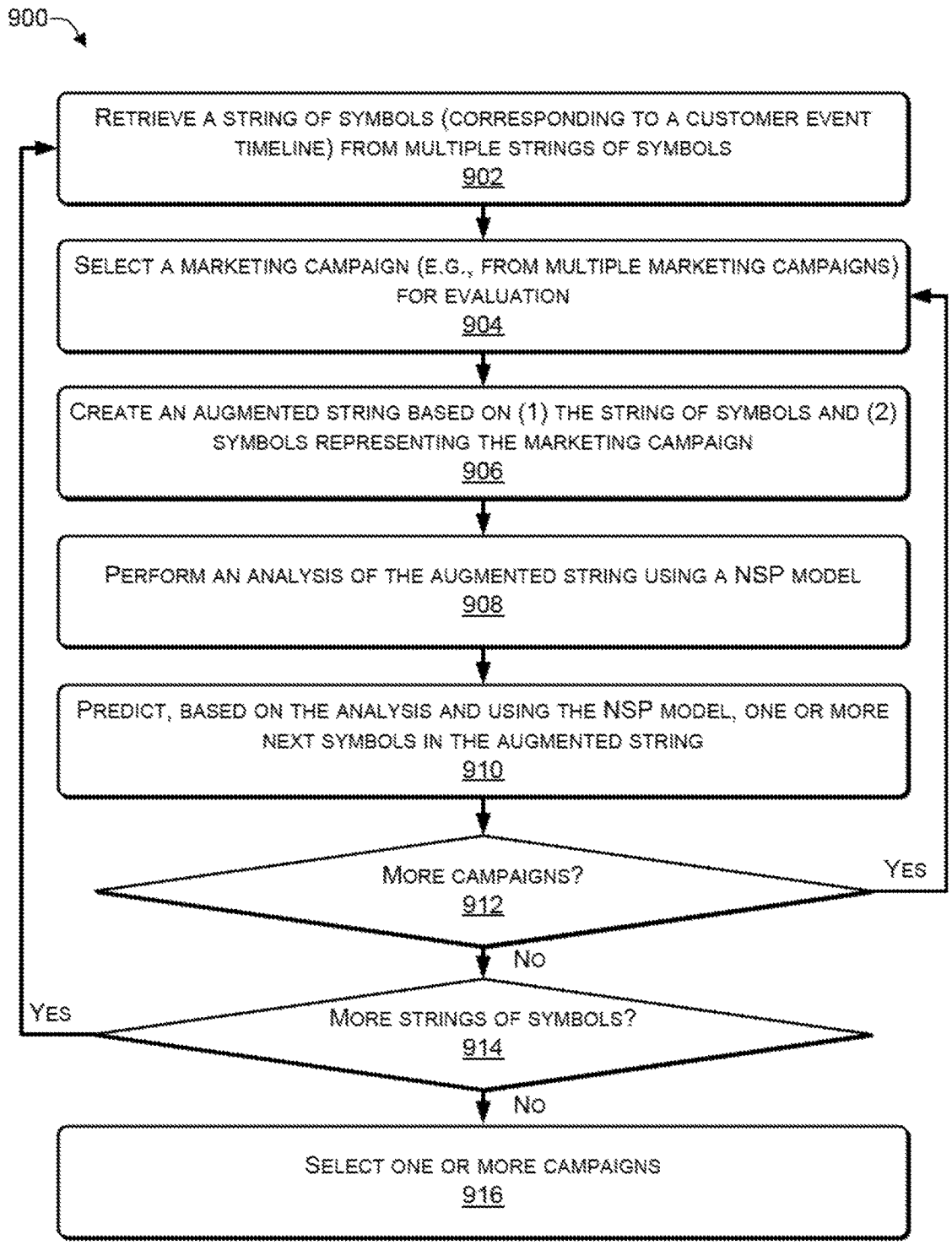
FIG. 9 is a flowchart of a process that includes creating augmented strings according to some embodiments.

FIG. 9 is a flowchart of a process 900 that includes creating augmented strings according to some embodiments. The process 900 may be performed by a software module, such as the analysis module 404 of FIG. 4.

At 902, a string of symbols (corresponding to a customer event timeline) may be selected from multiple strings of symbols. For example, a vendor may use a software program (e.g., the analysis module 404 of FIG. 4) to analyze data (e.g., gathered from CRM, CTR, phone system, email server, call center, and the like) associated with the vendor's customers to create event timelines for each customer. The software program may create a string of symbols corresponding to each customer's event timeline. In this way, multiple event timelines may be determined based on customer-related data, and multiple strings of symbols corresponding to the multiple event timelines may be created. A string of symbols from the multiple strings of symbols may be selected. The multiple strings of symbols may correspond to all the customer event timelines or a subset of all the customer event timelines. For example, various criteria (e.g., demographics, income, location, and the like) may be used to select a particular subset of customers.

At 904, a marketing campaign may be selected for evaluation (e.g., from multiple campaigns). At 906, an augmented string may be created by adding symbols representing the actions in the selected marketing campaign to the event timeline. At 908, an NSP model may be used to analyze the augmented string. For example, in FIG. 3, the string of symbols M-W-D-P30k that symbolically represent the customer's event timeline may be augmented using the string of symbols Mp-E-C-Ms that represent the actions in the marketing campaign to create an augmented string of symbols M-W-D-P30k-Mp-E-C-Ms. The NSP model 314 may analyze the augmented string of symbols to predict one (or more) next symbols. For example, in FIG. 3, the NSP model 314 may predict that a next event 310 includes the vendor servicing the individual's car, resulting in revenue of $350 (represented symbolically as S350). In this way, the NSP model 314 may, for each marketing campaign, predict whether the next event (or next set of events) includes a revenue event and predict how much revenue will be received. The NSP model may thus predict the next symbol(s) and the resulting revenue in the augmented timeline based on the customer's past behavior (e.g., the customer's event timeline).

At 910, the NSP model may predict, based on the analysis of the augmented string, one or more next symbols. For example, in FIG. 3, the NSP model 314 may analyze the augmented string of symbols and predict one (or more) next symbols. To illustrate, the NSP model 314 may predict that a next event 310 may include the vendor servicing the individual's car, thereby resulting in revenue of $350 (represented symbolically as S350).

At 912, a determination may be made whether there are more marketing campaigns to be evaluated. If the determination at 912 is yes, then the process may proceed to 904 where a next marketing campaign may be selected. The process may repeat 904, 906, 908, 910, and 912 until all marketing campaigns that are to be evaluated have been selected. If the determination at 912 is no, then the process may proceed to 914.

At 914, a determination may be made whether there are more strings of symbols. If the determination at 914 is yes, then the process may proceed to 902 where a next string of symbols may be retrieved. The process may repeat 902, 904, 906, 908, 910, 912, and 914 until all the strings of symbols from the multiple strings of symbols have been selected.

In this way, the NSP model 314 may, for each marketing campaign, predict whether the next event (or next set of events) includes a revenue event and predict how much revenue will be received. For example, in Table 1, an expected revenue column may be added, with the first campaign 302 predicted to yield $100, the second campaign 304 predicted to yield $350, and the third campaign predicted to yield $200.

Figure 10:
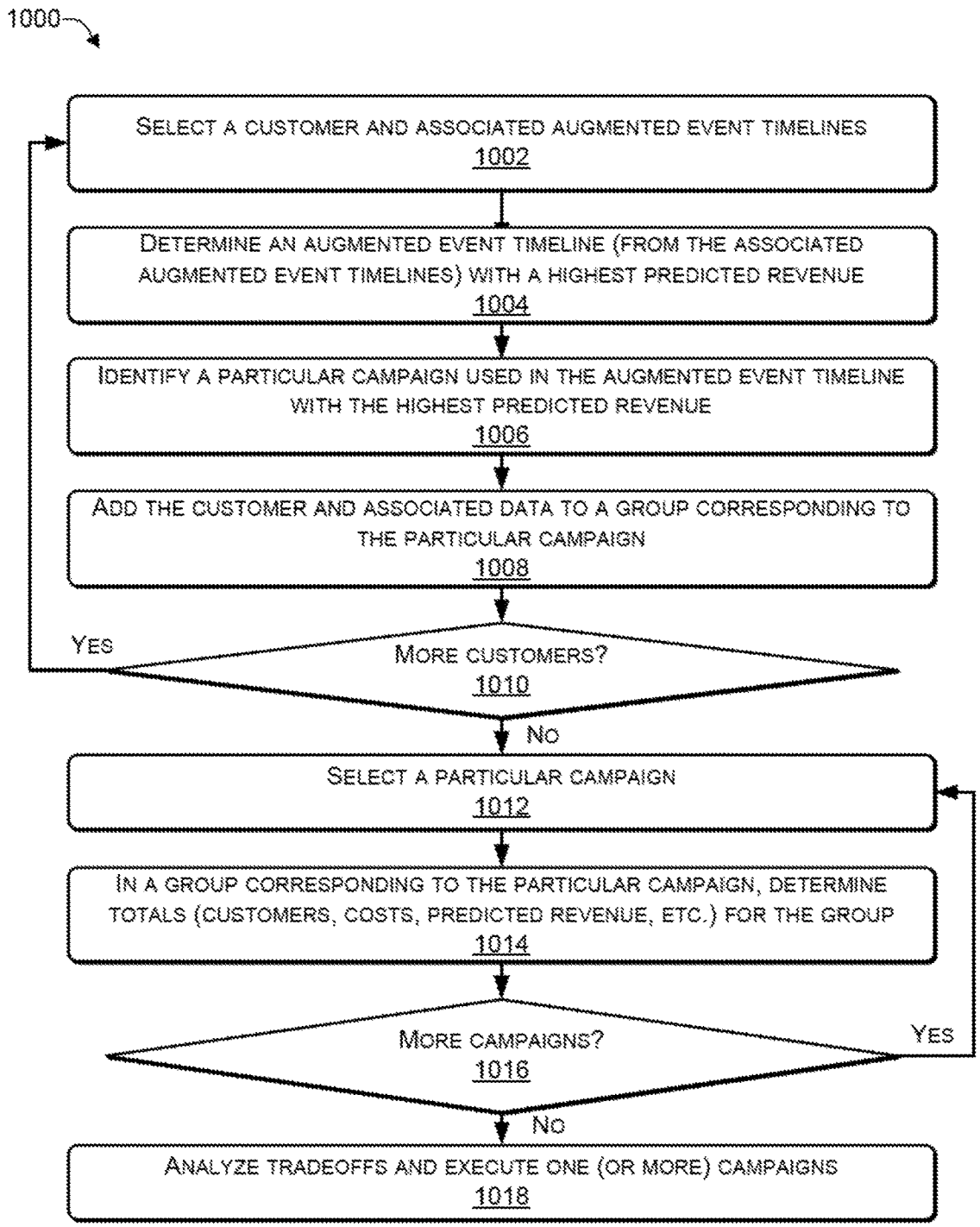
FIG. 10 is a flowchart of a process that includes determining outcomes associated with one or more campaigns according to some embodiments.

At 916, one or more campaigns may be selected (e.g., based on various criteria or tradeoffs), as described in more detail in FIG. 10. For example, one or more campaigns may be selected based on highest revenue, cost is less than a predetermined amount (e.g., marketing budget), highest revenue per dollar (or other currency), and so on.

FIG. 10 is a flowchart of a process 1000 to group customers that respond to a particular marketing campaign in a similar manner according to some embodiments. The process 1000 may be performed by a software module, such as the analysis module 404 of FIG. 4. The process 1000 may be performed after multiple marketing campaigns have been evaluated by the NSP model 314 of FIG. 3 (e.g., using augmented timelines) to predict one or more next symbols, including a next revenue event and an amount of revenue, in each of the multiple augmented timelines.

There are several strategies to select a marketing campaign, where a marketing campaign includes one or more actions that are performed by the vendor (or by a representative on behalf of the vendor) to target a particular set of customers. For example, a single marketing campaign may be selected to be performed to all customers (or a subset thereof). As another example, multiple campaigns may be selected, with each campaign targeting a particular subset of the population, including very small subsets (e.g., a single individual). As yet another example, one or more marketing actions may be selected from at least two different marketing campaigns and combined to create a new marketing campaign. As a further example, a marketing campaign may be selected and then modified by adding marketing actions (e.g., those predicted to increase revenue) from other marketing campaigns, deleting marketing actions that are predicted to result in less than a threshold increase to vendor value (including marketing actions predicted to negatively affect revenue), and the like. Various tradeoffs and/or criteria may be taken into consideration when selecting one or more marketing campaigns for execution. For example, the tradeoffs and/or criteria may include a cost of each campaign per customer, predicted revenue per customer, predicted customer satisfaction, and the like. The process 1000 illustrates one particular campaign selection strategy. Of course, other types of criteria and tradeoffs may be used to select one or more campaigns. The exemplary process 1000 identifies and groups together each customer for whom a particular (e.g., same) marketing campaign resulted in the highest predicted revenue in one of the customer's augmented event timelines. For example, the same marketing campaign may cause a set of customer's augmented event timelines to have the highest predicted revenue among those customer's augmented timelines. The process 1000 thus identifies each group of customers that have a similar set of preferences, e.g., the customers in the group respond to the particular marketing campaign in a similar way (e.g., primarily positively) resulting in a highest predicted revenue among all marketing campaigns.

At 1002, a customer may be selected from a group of customers whose augmented timelines were evaluated (e.g., using the NSP model 314 of FIG. 3). At 1004, the customer's augmented event timeline with the highest predicted revenue (from among all of the customer's augmented event timelines) may be determined. At 1006, the particular marketing campaign used in the augmented event timeline with the highest predicted revenue may be identified. At 1008, the customer and data associated with the campaign, such as campaign costs, predicted revenue, and the like, may be added to a group associated with the particular campaign. Thus, each marketing campaign may have a corresponding group. At the end of the process 1000, the customers may be grouped into multiple groups (corresponding to the multiple marketing campaigns), with each group including a set of customers that were predicted to respond similarly to the corresponding marketing campaign along with the costs to execute the corresponding marketing campaign, the predicted revenue which the corresponding marketing campaign will generate, and the like.

At 1010, a determination may be made if there are more customers. If the determination at 1010 is yes, then the process proceeds to 1002, where a next customer is selected. If the determination at 1010 is no, then the process proceeds to 1012.

At 1012, a particular campaign is selected. At 1014, the group corresponding to the campaign may be analyzed to determine the totals for that group, such as, for example, the total number of customers in the group, the total costs associated with marketing the campaign to the customers in the group, the total predicted revenue that the campaign may generate, and the like.

At 1016, a determination may be made whether there are more campaigns. If the determination at 1016 is yes, then the process proceeds to 1012 where a next campaign is selected. If the determination at 1016 is no, then the process proceeds to 1018 where tradeoffs between the campaigns are analyzed and one or more campaigns are selected for execution (e.g., deployment). For example, the tradeoffs between marketing costs and predicted revenue may be examined to identify the marketing campaigns that target specific customer groups, resulting in the highest predicted revenue (e.g., without regard to cost), the highest predicted revenue per dollar (e.g., highest revenue with lowest costs), total predicted revenue when costs are kept within a predetermined marketing budget, and the like.

At the end of the process 1000, the customers may be grouped into multiple groups (corresponding to the multiple marketing campaigns), with each group including a set of customers that were predicted to respond similarly to the corresponding marketing campaign along with the costs to execute the corresponding marketing campaign, the predicted revenue which the corresponding marketing campaign will generate, and the like. As an example, use campaigns 302, 304, and 306 of FIG. 3. Assume the event timelines of 60,000 individuals were analyzed by augmenting each customer's event timeline with each of the campaigns 302, 304, and 306 to create 180,000 augmented event timelines. The augmented event timelines may be analyzed using the VVP model 312 to determine a predicted resulting revenue. A group corresponding to each marketing campaign is created. For each individual of the 60,000 individuals, the associated three augmented timelines may be analyzed to identify the particular augmented event timeline with the highest predicted revenue. The particular marketing campaign with which the particular event timeline was augmented may be identified. The individual (along with associated data, such as cost, predicted revenue, etc.) may be added to the group corresponding to the particular marketing campaign. Assume a first group corresponding to the first marketing campaign includes 5,000 individuals, a second group corresponding to the second marketing campaign includes 35,000 individuals, and a third group corresponding to the third marketing campaign includes 20,000 individuals. The vendor may analyze the total vendor values and costs for each group and weigh various tradeoffs to determine which marketing campaign(s) to deploy. For example, deploying the second and third marketing campaigns may achieve a high total predicted revenue while going slightly over a marketing budget. The vendor may choose these tradeoffs and decide to allocate additional funds to the marketing budget to achieve the high total predicted revenue. Deploying the third marketing campaigns may reach fewer people but may achieve a slightly lower total predicted revenue while also satisfying the marketing budget. The vendor may choose these tradeoffs and decide to stay within the marketing budget. Deploying the second marketing campaigns may reach a larger number of people than the third marketing campaign alone but may achieve a slightly lower total predicted revenue than the third marketing campaign while also satisfying the marketing budget. The vendor may choose these tradeoffs and decide to reach more people.

Figure 11:
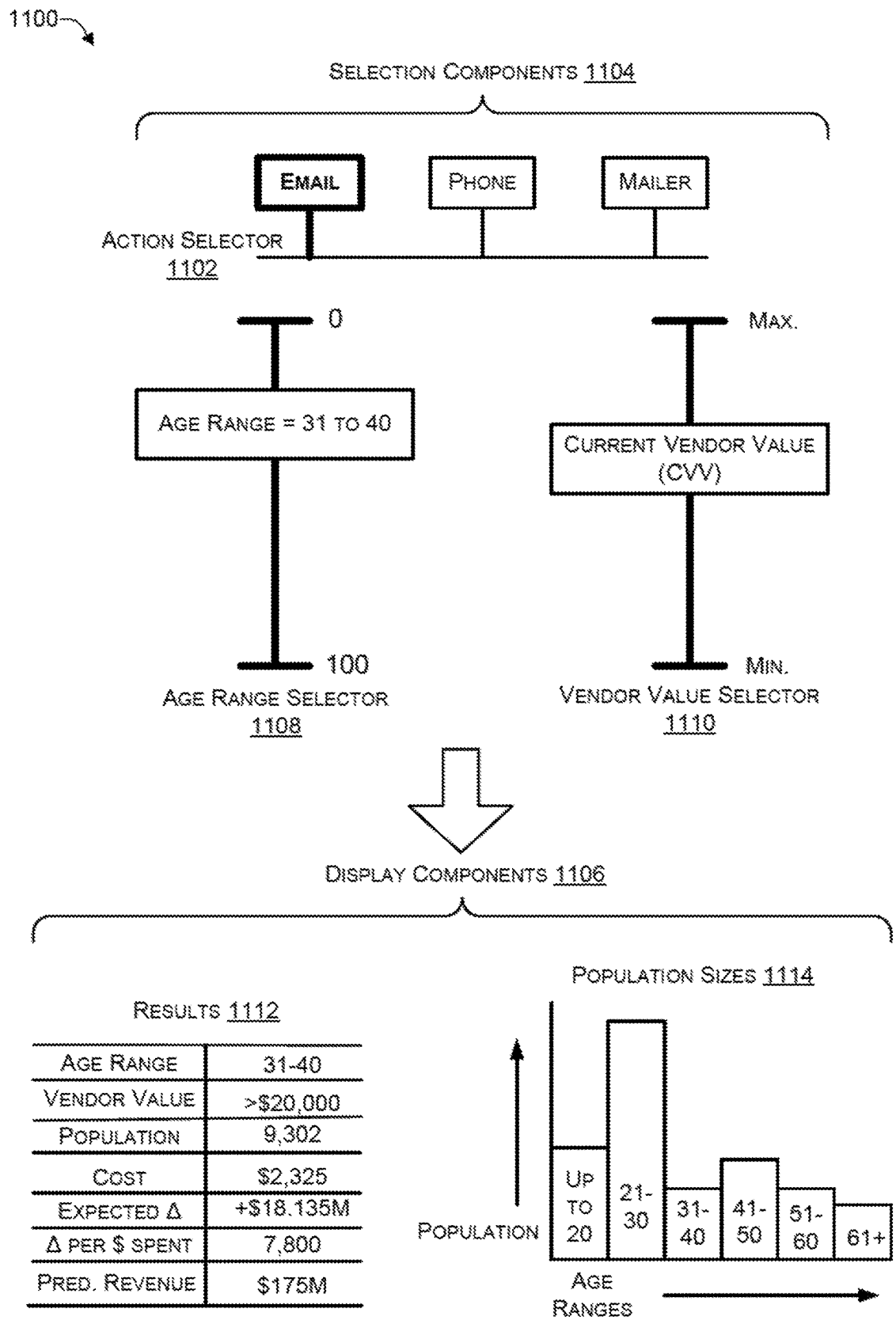
FIG. 11 is a block diagram illustrating exemplary selection components and exemplary display components according to some embodiments.

FIG. 11 is a block diagram illustrating an exemplary user interface (UI) 1100 that includes exemplary selection components and display components according to some embodiments. The UI 1100 may be displayed by a software module, such as the analysis module 404 of FIG. 4. For example, the analysis module 404 may display the UI 1100 to enable a vendor to select a marketing action using action selector 1102 and change tradeoffs using multiple selection components 1104. After the tradeoffs have been changed, the analysis module 404 may determine the results of selecting the tradeoffs and display the results in the UI 1100 via multiple display components 1106.

For example, the vendor may select a particular action, such as email, using the action selector 1102. The vendor may use the selection components 1104 to select a particular age range using an age range selector 1108 and select a desired ending vendor value using a vendor value selector 1110. In response, the analysis module 404 may determine the results and display the results using the display components 1106. For example, the UI 1100 may display results 1112, including age range, ending vendor values, population (e.g., number of customers predicted to respond to the action), the cost of the marketing campaign, expected change in vendor value, the amount of vendor value change per dollar, predicted revenue, and the like. The UI 1100 may display the resulting information using various types of display techniques, including tables, bar graphs, pie charts, graphs, Venn diagrams, and the like. For example, a bar graph may illustrate population sizes 1114. For example, in FIG. 11, the populations sizes 1114 indicate that the selected marketing action is predicted to reach the largest number of customers in the age range 21-30 years.

Figure 12:
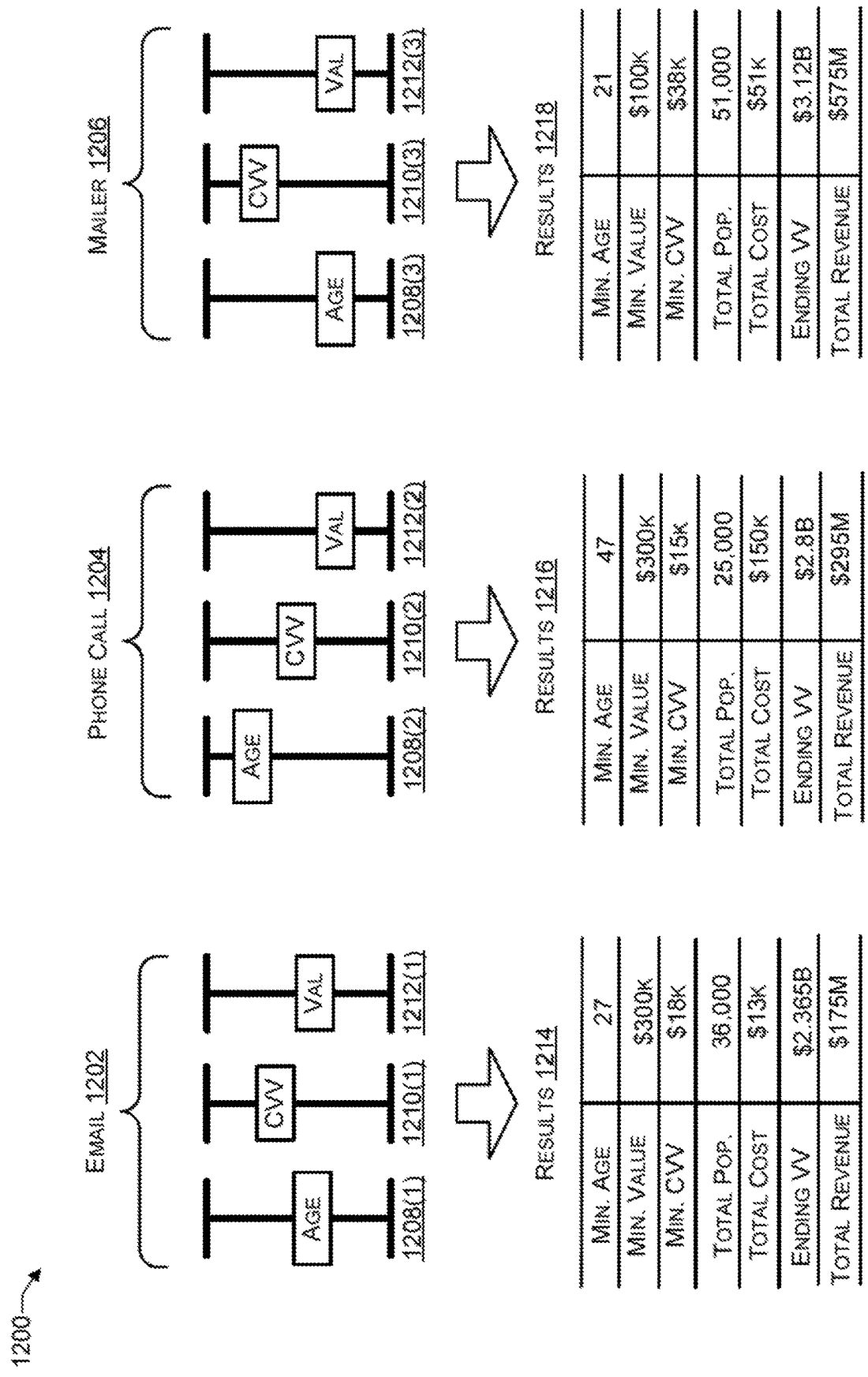
FIG. 12 is a block diagram illustrating how tradeoff parameters may be varied to identify target populations according to some embodiments.

FIG. 12 is a block diagram 1200 illustrating how tradeoff parameters may be varied to identify target populations according to some embodiments. The process 1200 may be performed by a software module, such as the analysis module 404 of FIG. 4. The vendor may be able to modify tradeoffs associated with a marketing action to select a specific population to achieve specific results.

For example, the vendor may select from three marketing actions, including sending an email 1202, making a phone call 1204 to a customer (e.g., the call placed by a representative of the vendor), and sending a mailer 1206 (e.g., brochure, coupon, or other printed material sent by mail). Each of the marketing actions 1202, 1204, 1206 may include three tradeoff sliders. A first slider 1208 may be used to select a minimum age (or an age range), second slider 1210 may be used to select a current vendor value, and a third slider 1212 may be used to select a desired change (e.g., increase) in vendor value to be achieved at the end of the marketing campaign. Adjusting the sliders 1208, 1210, and 1212 for the actions 1202, 1204, and 1206 may cause the analysis module 404 to display corresponding results 1214, 1216, and 1218. The results 1214, 1216, 1218 may include a minimum age of the population, a minimum current vendor value, a minimum predicted revenue, a total population (e.g., number of customers predicted to respond to the action), a total cost of the marketing campaign, a predicted ending vendor value, total predicted revenue, and the like.

Figure 13:
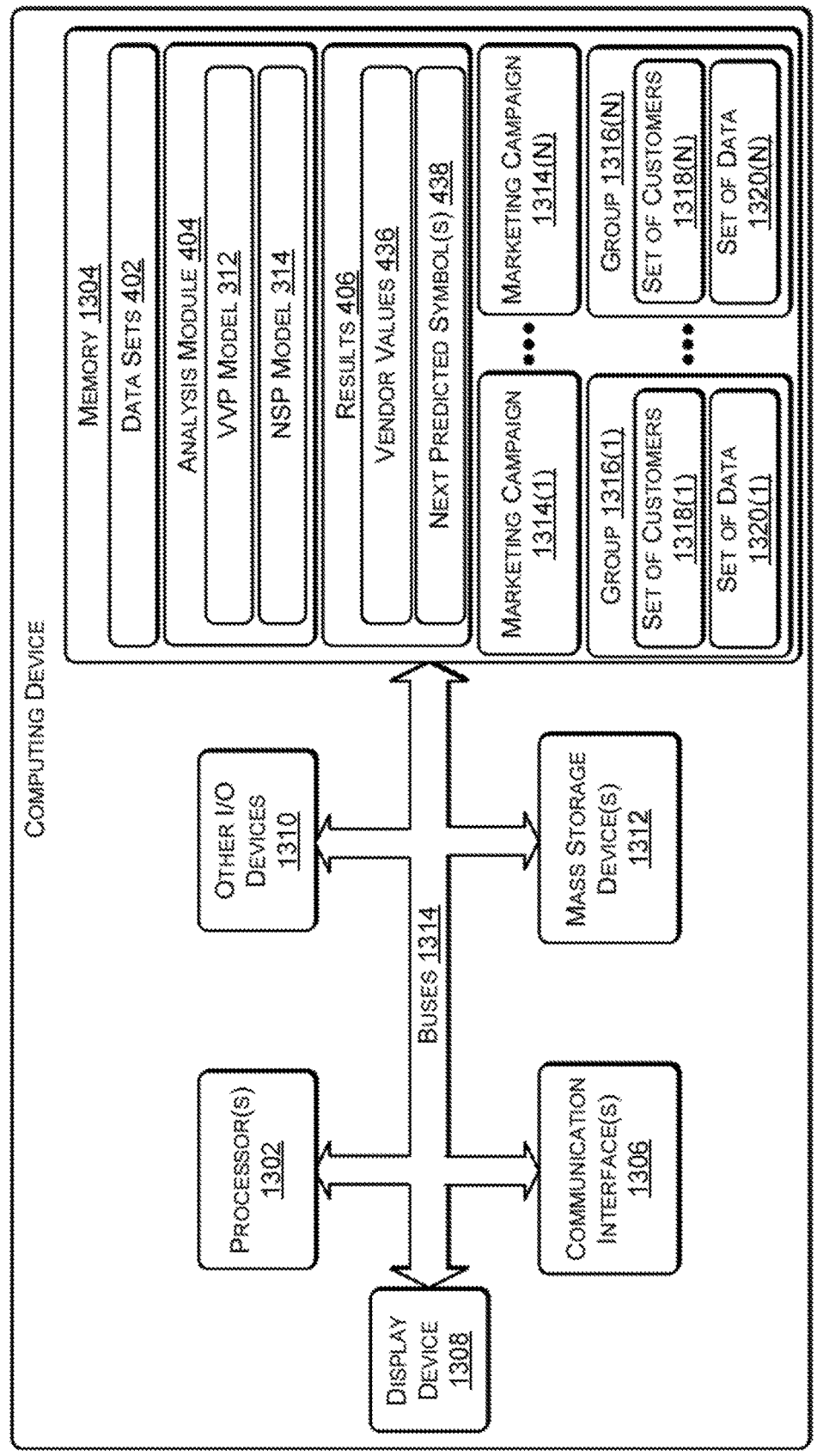
FIG. 13 illustrates an example configuration of a computing device that can be used to implement the systems and techniques described herein.

FIG. 13 illustrates an example configuration of a computing device (e.g., server) 1300 that can be used to implement the systems and techniques described herein. The computing device 1300 may include one or more processors 1302, a memory 1304, communication interfaces 1306, a display device 1308, other input/output (I/O) devices 1310, and one or more mass storage devices 1312, configured to communicate with each other, such as via system buses 1314 or other suitable connection. The system buses 1314 may include multiple buses, such as memory device buses, storage device buses, power buses, video signal buses, and the like. A single bus is illustrated in FIG. 13 purely for ease of understanding.

The processors 1302 are one or more hardware devices that may include a single processing unit or a number of processing units, all of which may include single or multiple computing units or multiple cores. The processors 1302 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processor 1302 may be configured to fetch and execute computer-readable instructions stored in the memory 1304, mass storage devices 1312, or other computer-readable media.

Memory 1304 and mass storage devices 1312 are examples of computer storage media (e.g., memory storage devices) for storing instructions that can be executed by the processor 1302 to perform the various functions described herein. For example, memory 1304 may include both volatile memory and non-volatile memory (e.g., RAM, ROM, or the like) devices. Further, mass storage devices 1312 may include hard disk drives, solid-state drives, removable media, including external and removable drives, memory cards, flash memory, floppy disks, optical disks (e.g., CD, DVD), a storage array, a network attached storage, a storage area network, or the like. Both memory 1304 and mass storage devices 1312 may be collectively referred to as memory or computer storage media herein, and may be a media capable of storing computer-readable, processor-executable program instructions as computer program code that can be executed by the processor 1302 as a particular machine configured for carrying out the operations and functions described in the implementations herein.

The computing device 1300 may also include one or more communication interfaces 1306 for exchanging data via a network with other computing devices. The communication interfaces 1306 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. Communication interfaces 1306 can also provide communication with external storage (not shown), such as in a storage array, network attached storage, storage area network, or the like. A display device 1308, such as a monitor may be included in some implementations for displaying information and images to users. Other I/O devices 1310 may be devices that receive various inputs from a user and provide various outputs to the user, and may include a keyboard, a remote controller, a mouse, a printer, audio input/output devices, and so forth.

The computer storage media, such as memory 1304 and mass storage devices 1312, may be used to store software and data. For example, the computer storage media may be used to store the data sets 402, the analysis module 404 (including the VVP model 312 and the NSP model 314), and the results 406 (including the vendor values 436 and the next predicted symbols 438). The computer storage media may be used to store marketing campaigns 1314(1) to 1314(N)

(where N>1) and groups 1316. Group 1316(1) may correspond to the marketing campaign 1314(1) and group 1316(N) may correspond to the marketing campaign 1314(N). Each of the groups 1316 may include a set of zero or more customers 1318 and a set of data 1320. For example, the set of customers 1318(1) may include customers for whom the marketing campaign 1314(1) was predicted to result in the highest ending vendor value or highest revenue, as compared to the other marketing campaigns. The set of customers 1318(N) may include customers for whom the marketing campaign 1314(N) was predicted to result in the highest ending vendor value or highest revenue, as compared to the other marketing campaigns. The set of data 1320(1) may include a cost to execute the marketing campaign 1314(1) for each customer in the set of customers 1318(1), a predicted revenue from executing the marketing campaign 1314(1) for each customer in the set of customers 1318(1), and other data (as discussed herein) related to executing the marketing campaign 1314(1) for each customer in the set of customers 1318(1).

Figure 14:
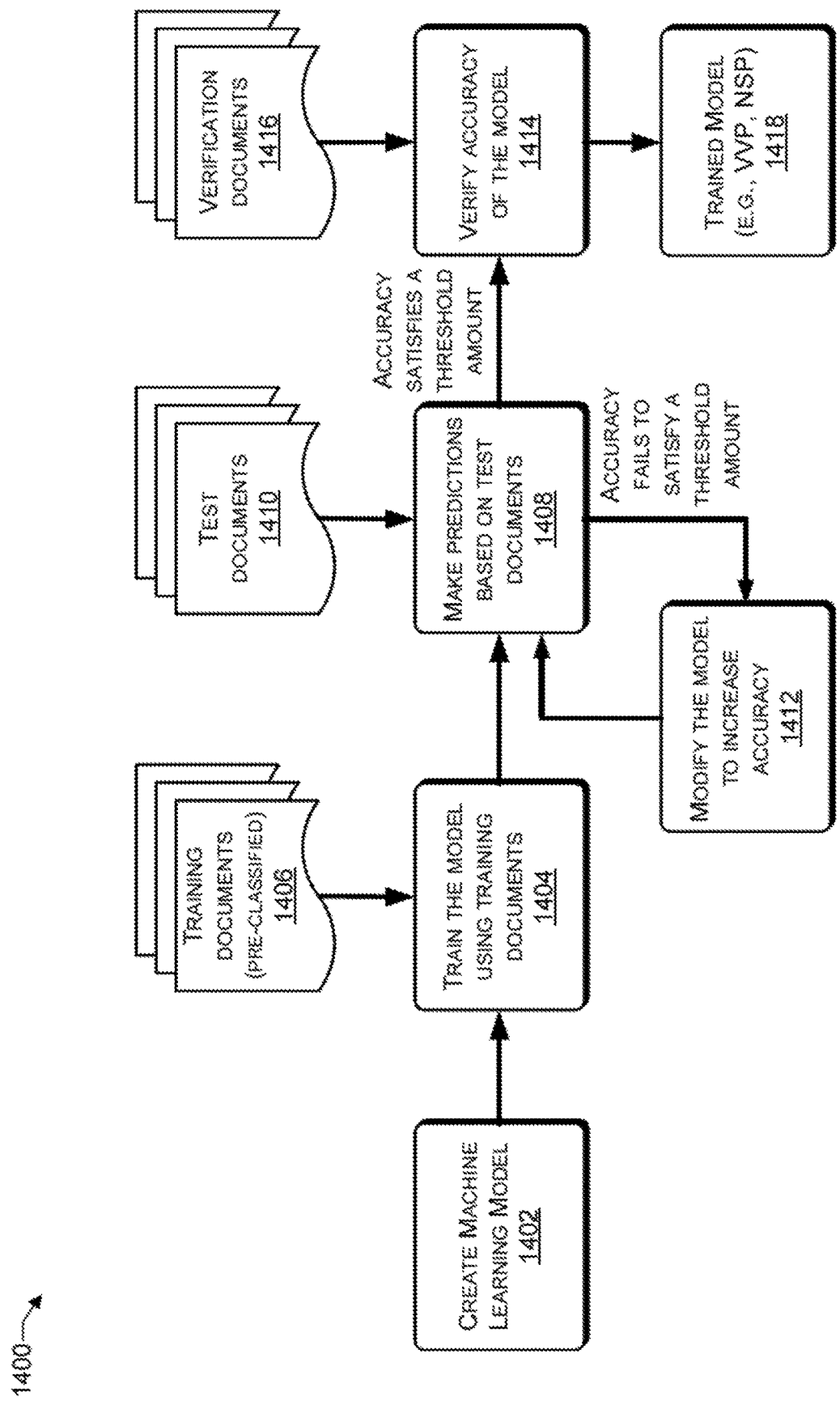
FIG. 14 illustrates training a machine learning model according to some embodiments.

FIG. 14 is a flowchart of a process 1400 to train a machine learning model (e.g., VVP model or NSP model) according to some embodiments. For example, the process 1400 may be performed by one or more components (e.g., the AI engine 410) of the architecture 400 of FIG. 4.

At 1402, a machine learning model (e.g., a software program) may be created, using an algorithm such as support vector machine, (SVM), decision tree learning, association rule learning, artificial neural networks, deep learning, inductive logic programming, clustering, Bayesian networks, reinforcement learning, representation learning, rule-based machine learning or the like. For example, the machine learning model may be either the VVP model 312 or the NSP model 314 of FIG. 3.

At 1404, training documents 1406 that have been pre-classified may be derived from at least a portion of historical customer-related data (e.g., multiple event timelines or strings of symbols representing the multiple event timelines), may be used to train the model. For example, in FIG. 4, a historical data set (e.g., one or more of the data sets 402) may include information associated with multiple individuals or multiple businesses. The information may be retrieved from a CRM server, a web hosting server that captures CTR, a call center, a phone system, an email server, an online chat server, inventory/sales system, and the like. In some cases, a subset of the historical data set 402 may be used to train the model while in other cases, all of the historical data set 402 may be used. The historical data set 402 may be used to create event timelines that are used in the training documents 1406 to train a VVP model. The event timelines may be used to create strings of symbols that are used in the training documents 1406 to train an NSP model.

At 1408, a set of test documents 1410 (e.g., derived from the historical data set 402) may be used to test the trained model. For example, the VVP model may be used to predict a vendor value after each action in a marketing campaign, an ending vendor value after the completion of the marketing campaign, or both. As another example, the NSP model may be used to predict a next symbol in each of multiple strings of symbols in the test documents 1410. Each string of symbols may include a first portion that includes a string of symbols representing an event timeline and a second portion that includes actual results from executing a marketing campaign. The predicted next symbols may be compared with the actual next symbols corresponding to actual revenue events that occurred after executing marketing campaigns. Based on the predictions, an accuracy of the trained model may be determined. If the accuracy fails to satisfy (e.g., is greater than or equal to) a threshold amount, then, at 1412, the model may be modified (including retrained with additional data) and re-tested at 1408. The process may repeat 1408 and 1412 until the accuracy satisfies (e.g., is less than) the threshold amount.

When the accuracy satisfies the threshold amount, 1414 the accuracy of the trained model may be verified using verification documents 1461 that include event timelines (e.g., for a VVP model) or strings of symbols corresponding to the event timelines (e.g., for an NSP model). After the accuracy of the model has been verified, the trained model may be used as a production model to predict ending vendor values (for a VVP model) or a next symbol (for an NSP model).

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement pre-scribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. One or more non-transitory computer-readable storage media storing instructions executable by one or more processors to perform operations comprising:
    obtaining, with a computer system, at least two million event timelines describing events involving interactions between a first set of entities of a first type and a second set of entities of a second type, the events including reference events and non-reference events;

training, with the computer system, using the at least two million event timelines, a decision-learning-tree machine-learning model to infer, for a given non-reference event involving a given pair of a given entity of the first type among the first set and a given entity of the second type among the second set, a corresponding score indicative of a likelihood of occurrence of one or more predicted reference events involving the given entity of the second type and the given entity of the first type given that the given non-reference event occurred;

training, with the computer system, using at least part of the at least two million event timelines, a Bayesian-network machine-learning model to predict subsequent events given an event timeline;

obtaining, with the computer system, a new set of event timelines;

obtaining, with the computer system, a candidate sequence of non-reference events;

augmenting each new event timeline in the new set of event timelines by:
concatenating the candidate sequence of non-reference events with respective new event timelines to form concatenated event timelines;
predicting subsequent events for each of the concatenated event timelines with the trained Bayesian-network machine-learning model; and
concatenating the predicted subsequent events with the concatenated event timelines to form augmented event timelines;

inferring, with the computer system, respective scores for each of the augmented event timelines with the trained decision learning tree machine learning model;

determining, with the computer system, subsets of entities of the second type based on the inferred respective scores; and storing, with the computer system, the subsets of entities of the second type in memory.

2. The one or more media of claim 1, wherein the at least two million event timelines are obtained from multiple data sources.

3. The one or more media of claim 1, wherein augmenting comprises, for a given event timeline in the new set of event timelines:
obtaining a plurality of candidate sequences of non-reference events, including the candidate sequence of non-reference events; and
concatenating each of the candidate sequences to a respective instance of the given event timeline to form at least some of the concatenated event timelines; and
the plurality of candidate sequences are different candidate sequences.

4. The one or more media of claim 3, wherein the operations comprise:
selecting subset of the plurality of candidate sequences based on the inferred respective scores.

5. The one or more media of claim 1, wherein obtaining the new set of event timelines comprises steps for determining a plurality of event timelines based on multiple data sources.

6. The one or more media of claim 1, wherein obtaining the new set of event timelines comprises obtaining global events.

7. The one or more media of claim 1, wherein:
the new set of event timelines are encoded as respective strings of symbols;
at least some individual symbols in the strings of symbols represent respective events; and
different events classified as similar share the same symbol.

8. The one or more media of claim 1, Wherein:
determining subsets of entities is based on a set of objectives and a set of constraints and accounts for dependencies.

9. The one or more media of claim 1, wherein:
a feature to which the Bayesian-network machine-learning model is responsive is based on a duration of time between two events in the at least two million event timelines.

10. The one or more media of claim 1, wherein:
a feature to which the trained decision learning tree machine learning model is responsive is based on a duration of time between two events in the new set of event timelines.

11. The one or more media of claim 1, Wherein:
the candidate sequence of non-reference events comprises a plurality of non-reference events.

12. The one or more media of claim 11, wherein:
the candidate sequence of non-reference events comprises non-reference events corresponding to a plurality of channels and times.

13. The one or more media of claim 1, wherein determining subsets of entities of the second type based on the inferred respective scores comprises:
ranking entities of the second type by their inferred respective scores and applying a threshold.

14. The one or more media of claim 1, wherein the operations comprise:
obtaining results of effectuating events in the candidate sequence of non-reference events;
comparing, to a threshold, a difference between the results and predictions of the Bayesian-network machine-learning model or the trained decision learning tree machine learning model; and
determining, based on the comparison, to retrain the Bayesian-network machine-learning model or the trained decision learning tree machine learning model.

15. The one or more media of claim 1, wherein the operations comprise:
steps for predicting a next event in an event timeline.

16. The one or more media of claim 1, wherein the operations comprise:
steps for assigning a symbol to each event that previously occurred.

17. The one or more media of claim 1, wherein the computer system comprises:
means for analyzing event timelines.

18. The one or more media of claim 1, wherein:
training the Bayesian-network machine-learning model or training the decision-learning-tree machine-learning model comprises steps for training a production model; and
inferring respective scores comprises steps for determining outcomes.

19. The one or more media of claim 1, wherein augmenting each new event timeline in the new set of event timelines comprises:
steps for creating augmented event timelines; and
steps for creating augmented strings.

20. A method, comprising:
- obtaining, with a computer system, at least two million event timelines describing events involving interactions between a first set of entities of a first type and a second set of entities of a second type, the events including reference events and non-reference events;
- training, with the computer system, using the at least two million event timelines, a decision-learning-tree machine-learning model to infer, for a given non-reference event involving a given pair of a given entity of the first type among the first set and a given entity of the second type among the second set, a corresponding score indicative of a likelihood of occurrence of one or more predicted reference events involving the given entity of the second type and the given entity of the first type given that the given non-reference event occurred;
- training, with the computer system, using at least part of the at least two million event timelines, a Bayesian-network machine-learning model to predict subsequent events given an event timeline;
- obtaining, with the computer system, a new set of event timelines;
- obtaining, with the computer system, a candidate sequence of non-reference events;
- augmenting each new event timeline in the new set of event timelines by:
  - concatenating the candidate sequence of non-reference events with respective new event timelines to form concatenated event timelines;
  - predicting subsequent events for each of the concatenated event timelines with the trained Bayesian-network machine-learning model; and
  - concatenating the predicted subsequent events with the concatenated event timelines to form augmented event timelines;
- inferring, with the computer system, respective scores for each of the augmented event timelines with the trained decision learning tree machine learning model;
- determining, with the computer system, subsets of entities of the second type based on the inferred respective scores; and
- storing, with the computer system, the subsets of entities of the second type in memory.

* * * * *